(12) United States Patent
Hearn et al.

(10) Patent No.: US 12,066,539 B2
(45) Date of Patent: Aug. 20, 2024

(54) METHODS AND APPARATUS FOR LOCATING DEVICES

(71) Applicant: STMicroelectronics (Research & Development) Limited, Marlow (GB)

(72) Inventors: Brent Edward Hearn, East Calder (GB); Marek Jan Munko, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 922 days.

(21) Appl. No.: 17/119,689

(22) Filed: Dec. 11, 2020

(65) Prior Publication Data

US 2022/0187462 A1     Jun. 16, 2022

(51) Int. Cl.
| | | |
|---|---|---|
| *G01C 3/08* | (2006.01) | |
| *G01S 7/484* | (2006.01) | |
| *G01S 7/4863* | (2020.01) | |
| *G01S 17/89* | (2020.01) | |
| *B64C 39/02* | (2023.01) | |
| *B64U 101/30* | (2023.01) | |

(52) U.S. Cl.
CPC .............. *G01S 17/89* (2013.01); *G01S 7/484* (2013.01); *G01S 7/4863* (2013.01); *B64C 39/024* (2013.01); *B64U 2101/30* (2023.01)

(58) Field of Classification Search
CPC ........ G01S 17/89; G01S 7/484; G01S 7/4863; B64U 2101/30
See application file for complete search history.

(56) References Cited

U.S. PATENT DOCUMENTS

2021/0385424 A1* 12/2021 Assmann ............. H04N 13/239

FOREIGN PATENT DOCUMENTS

| DE | 102019220289 A1 * | 6/2020 | ........... G02B 26/123 |
| DE | 102020103673 A1 * | 8/2020 | ........... G06F 18/251 |
| JP | 2018026009 A * | 2/2018 | ............... G08G 1/13 |

OTHER PUBLICATIONS

Corrigan, Fintan, "Flash Lidar Time of Flight (ToF) Camera Sensors on Drones and 10 Terrific Uses," DroneZon, https://www.dronezon.com/learn-about-drones-quadcopters/best-uses-for-time-of-flight-tof-camera-depth-sensor-technology-in-drones-or-ground-based/, Jun. 17, 2020, 22 pages.
Li, Larry, "Time-of-Flight Camera - An Introduction," Texas Instruments, Technical White Paper, SLAO190B, Jan. 2014, 10 pages.
Pohl, et al., "Depth Map Improvements for Sterio-based Depth Cameras on Drones," Proceedings of the Federated Conference on Computer Science and Information Systems, vol. 18, Sep. 1-4, 2019, pp. 341-348.

* cited by examiner

*Primary Examiner* — Mark Hellner
(74) *Attorney, Agent, or Firm* — Slater Matsil, LLP

(57) ABSTRACT

A method implemented by a first time of flight (ToF) sensor includes generating, by the first ToF sensor, a first depth map in accordance with measurements of reflections of an optical signal emitted by the first ToF sensor; communicating, by the first sensor with a second ToF sensor, the first depth map and a second depth map, the second depth map generated by the second ToF sensor; and determining, by the first ToF sensor, a relative location of the first ToF sensor relative to the second ToF sensor in accordance with the first depth map and the second depth map.

17 Claims, 17 Drawing Sheets

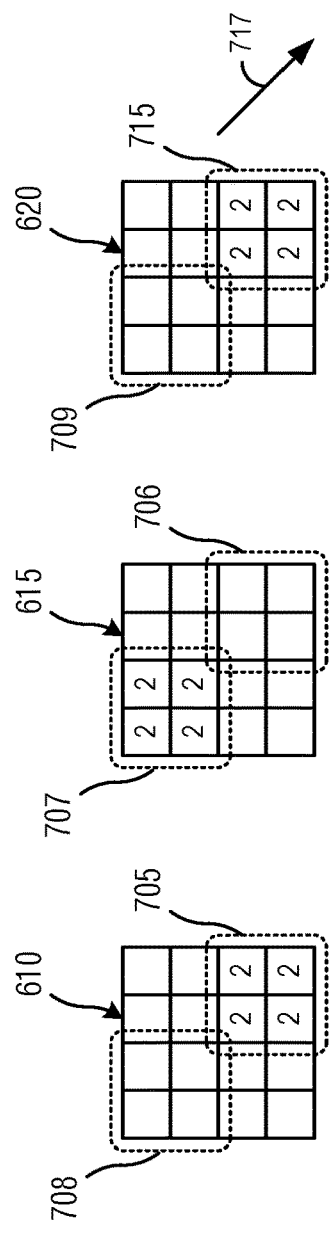
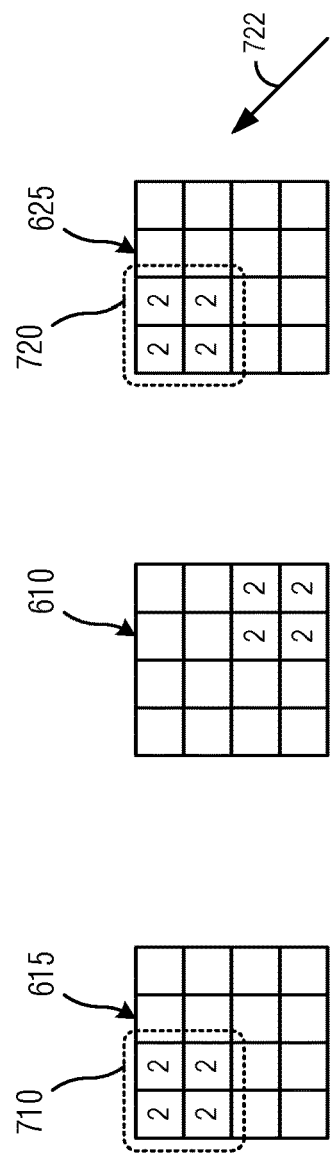
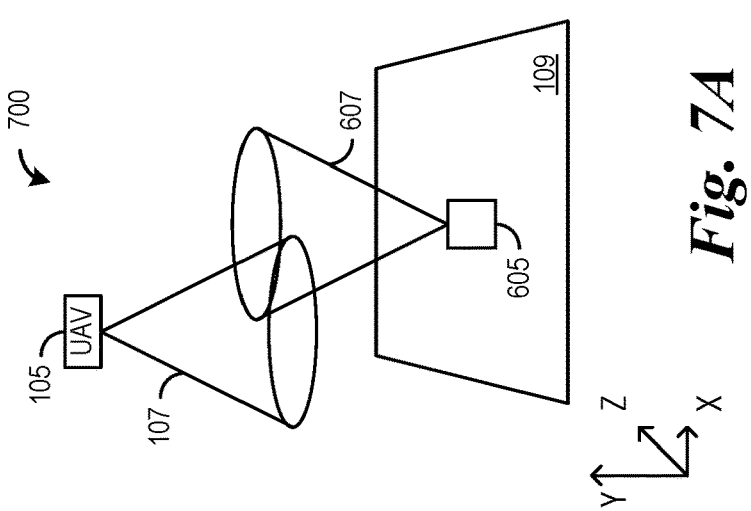
*Fig. 7A*, *Fig. 7B*, *Fig. 7C*, *Fig. 7D*, *Fig. 7E*, *Fig. 7F*, *Fig. 7G*

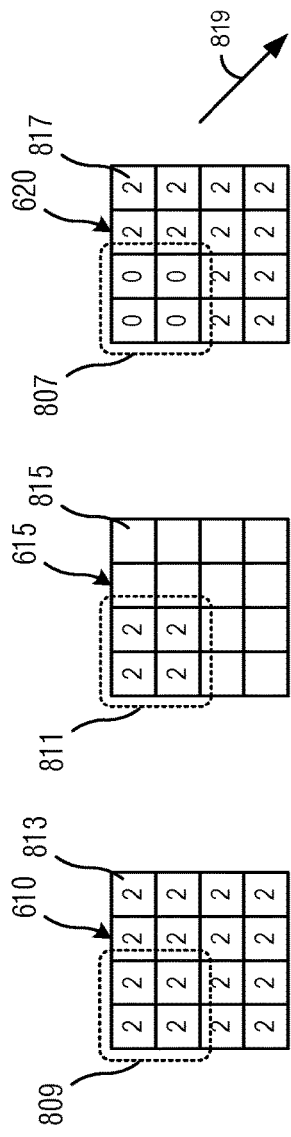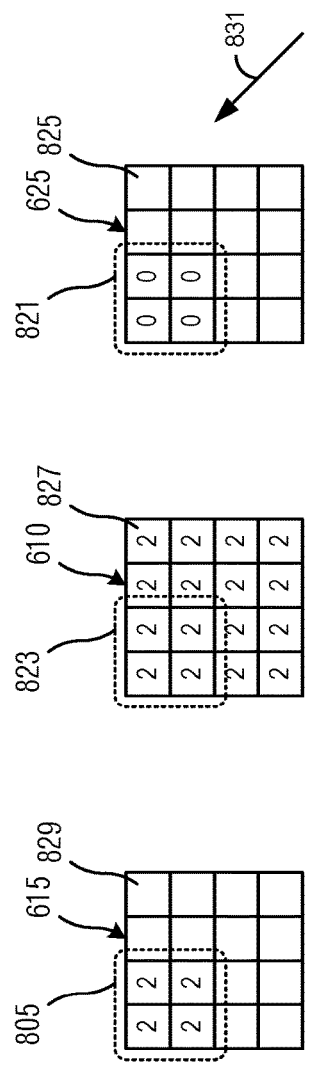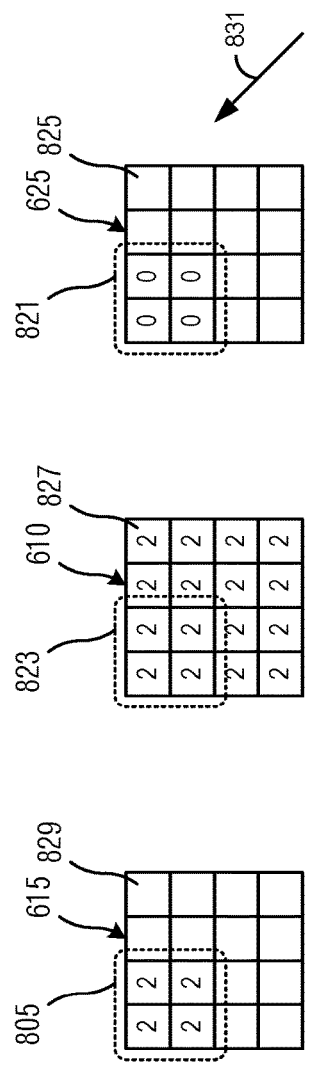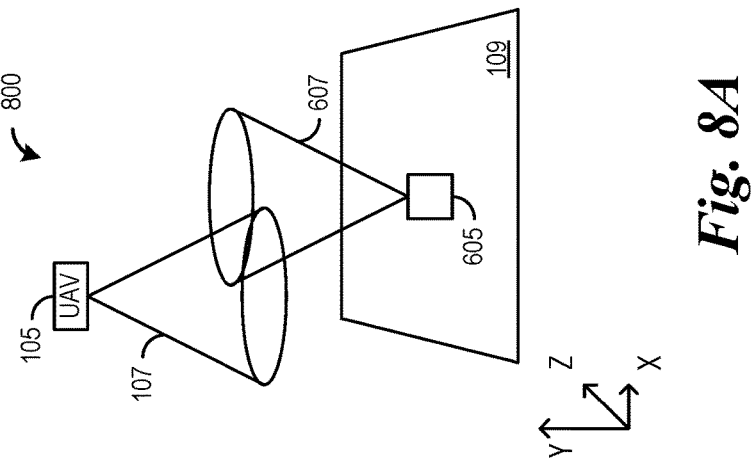

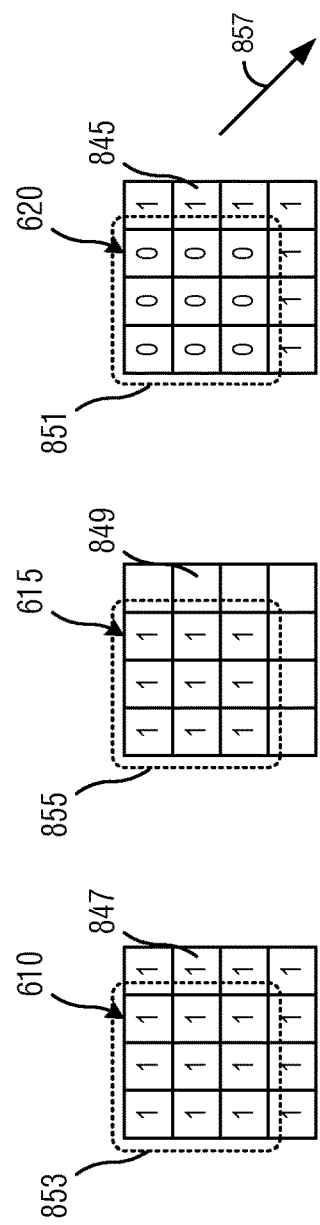
*Fig. 8K*
*Fig. 8J*
*Fig. 8I*
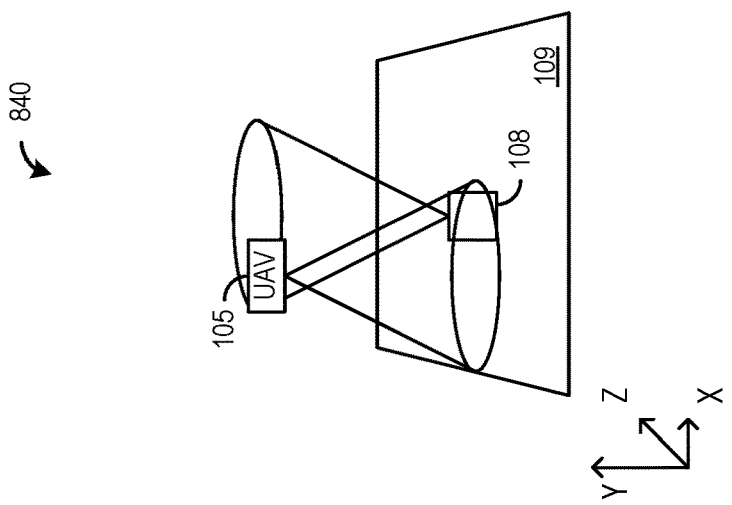
*Fig. 8H*

METHODS AND APPARATUS FOR LOCATING DEVICES

TECHNICAL FIELD

The present invention relates generally to methods and apparatus for locating devices.

BACKGROUND

A time of flight (ToF) sensor can transmit light pulses (or other forms of electromagnetic pulses) and receive reflections of the light pulses. A time difference between the transmission of the electromagnetic pulses and the reception of the reflections of the light pulses can be used to determine the distance between the ToF sensor and objects causing the reflections. The ToF sensor may be used to locate other sensors or devices including sensors, and locate the ToF sensor.

SUMMARY

In accordance with an embodiment, a method implemented by a first time of flight (ToF) sensor is provided. The method comprising: generating, by the first ToF sensor, a first depth map in accordance with measurements of reflections of an optical signal emitted by the first ToF sensor; communicating, by the first ToF sensor with a second ToF sensor, the first depth map and a second depth map, the second depth map generated by the second ToF sensor; and determining, by the first ToF sensor, a relative location of the first ToF sensor relative to the second ToF sensor in accordance with the first depth map and the second depth map.

In accordance with an embodiment, a method implemented by a first device having a first ToF sensor is provided. The method comprising: obtaining, by the first device from the first ToF sensor, a first depth map generated from measurements of reflections of an optical signal emitted by the first ToF sensor; communicating, by the first device with a second device having a second ToF sensor, the first depth map and a second depth map, the second depth map generated by the second device; determining, by the first device, a relative location of the first device to the second device in accordance with the first depth map and the second depth map; and adjusting, by the first device, a location of the first device in accordance with the relative location of the first device.

In accordance with an embodiment, a first device is provided. The first device comprising: a ToF sensor configured to emit an optical signal and measure reflections of the optical signal; one or more processors; and a non-transitory memory storage comprising instructions that, when executed by the one or more processors, cause the first device to: obtain, from the ToF sensor, a first depth map generated from the measurements of the reflections of the optical signal emitted by the ToF sensor; communicate, with a second device having a ToF sensor, the first depth map and a second depth map, the second depth map generated by the second device; determine a relative location of the first device to the second device in accordance with the first depth map and the second depth map; and adjust a location of the first device in accordance with the relative location of the first device.

BRIEF DESCRIPTION OF THE DRAWINGS

For a more complete understanding of the present invention, and the advantages thereof, reference is now made to the following descriptions taken in conjunction with the accompanying drawings, in which:

FIGS. 7A-7K illustrate diagrams of an example second situation involving the UAV and the landing pad, as well as depth maps and difference maps associated therewith according to an embodiment;

FIGS. 8A-8K illustrate diagrams of an example third situation involving the UAV and the landing pad, as well as depth maps and difference maps associated therewith according to an embodiment;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

In the ensuing description one or more specific details are illustrated, aimed at providing an understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. More-over, particular conformations, structures, or characteristics may be combined in any adequate way in one or more embodiments.

The references used herein are provided merely for convenience and hence do not define the scope of protection or the scope of the embodiments.

Locating a device is an important operation with regard to autonomous devices (ADs). Locating may also be referred to as ranging or positioning, and may be used interchangeably. Locating an AD involves determining the absolute location of the AD or the relative location of the AD relative to a reference point (such as another AD or an object in the environment). As an example, knowing the location of an AD can prevent the AD from crashing into other ADs or objects in the environment. As another example, knowing the location of an AD can help the AD map its environment, to help the AD navigate its environment in a confident manner. Locating an AD may also be referred to as determining the location of the AD.

Figure 1A:
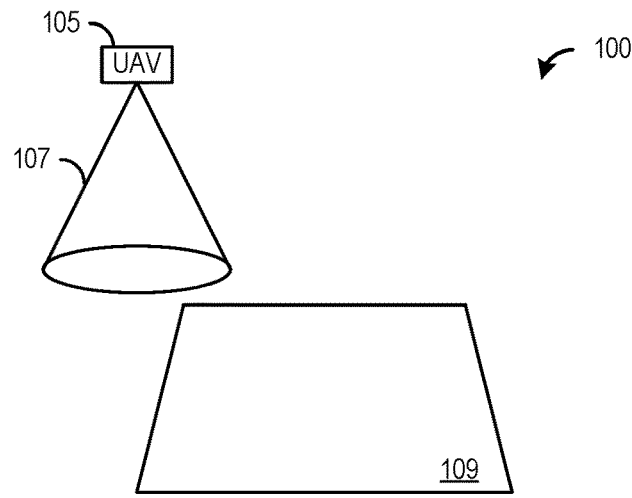
FIGS. 1A-1D are diagrams of example deployments of locating using sensors.

FIG. 1A illustrates a first example situation 100 involving the locating of an AD. In situation 100, the AD is an unmanned aerial vehicle (UAV) 105 that is attempting to land on a landing pad 109. UAVs are also commonly referred to as drones, unmanned flying devices, etc. As shown in FIG. 1A, UAV 105 features a sensor with a field of view 107. When UAV 105 comes close to landing pad 109, the sensor is able to detect landing pad 109 in field of view 107, and determine the location of UAV 105 (i.e., locating UAV 105). With UAV 105 located, UAV 105 may be able adjust its flight (as necessary) to safely land on landing pad 109.

Figure 1B:
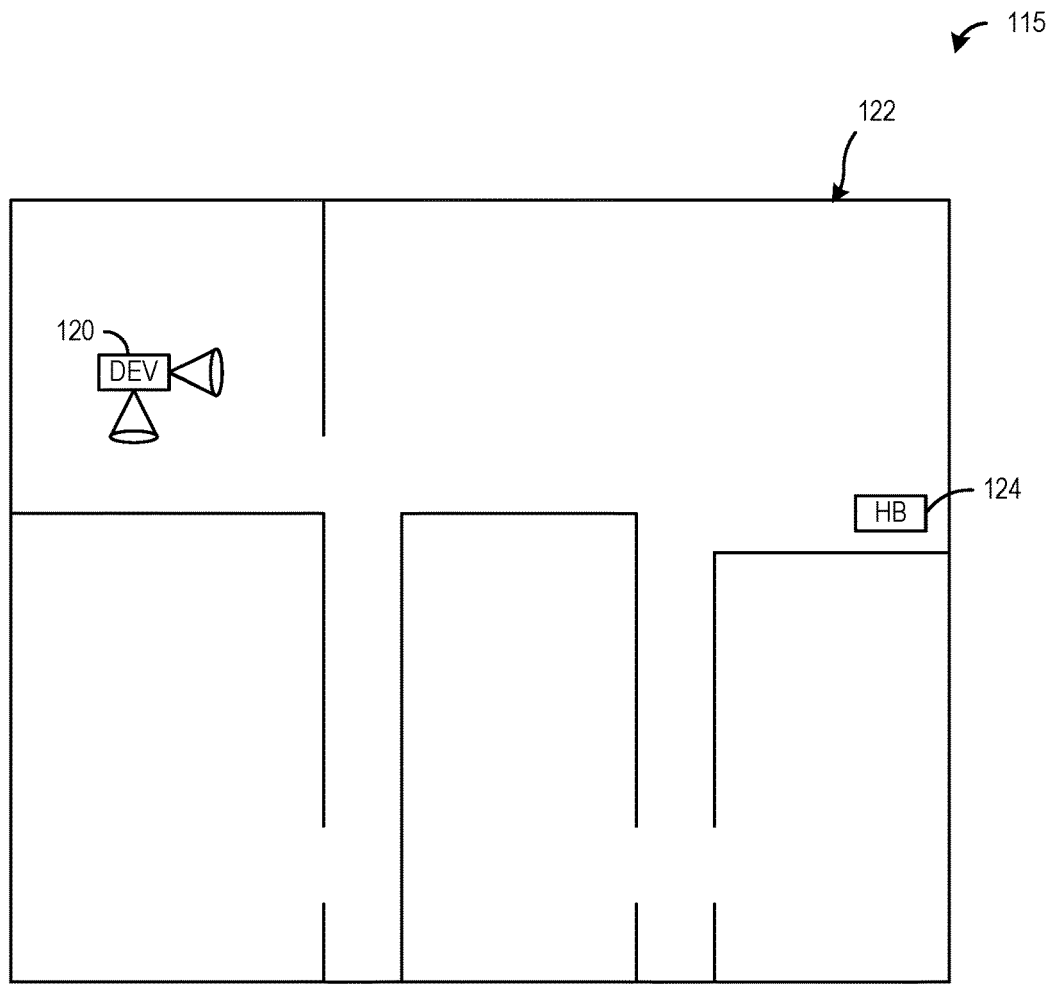

FIG. 1B illustrates a second example situation 115 involving the locating of an AD. In situation 115, the AD is an autonomous vacuum cleaner 120. Autonomous vacuum cleaner 120 operates in a house 122. In order to recharge, autonomous vacuum cleaner 120 has to connect to a home-base (HB) 124. Initially, autonomous vacuum cleaner 120 may roam throughout house 122 to determine the layout of house 122, as well as locate HB 124. Sensors in autonomous vacuum cleaner 120 help to locate autonomous vacuum cleaner 120 as well as identify objects and walls of house 122. Autonomous vacuum cleaner 120 may have one or more sensors.

Figure 1C:
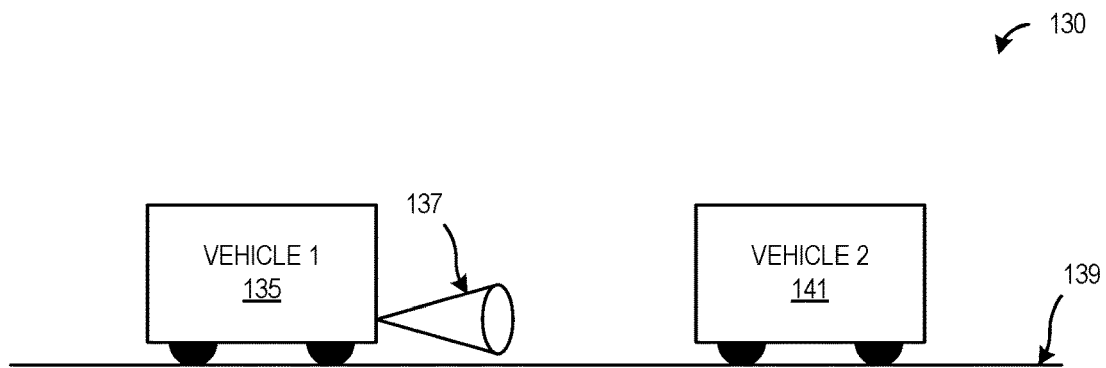

FIG. 1C illustrates a third example situation 130 involving the locating of an AD. In situation 130, the AD is a vehicle 135. Vehicle 135 has a sensor with a field of view 137 and is traveling on a road 139. Also on road 139 is vehicle 141. Vehicle 135 uses the sensor to locate itself and vehicle 141 to prevent a collision with vehicle 141. As an example, vehicle 135 may slow down if vehicle 135 determines that it is rapidly approaching vehicle 141.

Figure 1D:
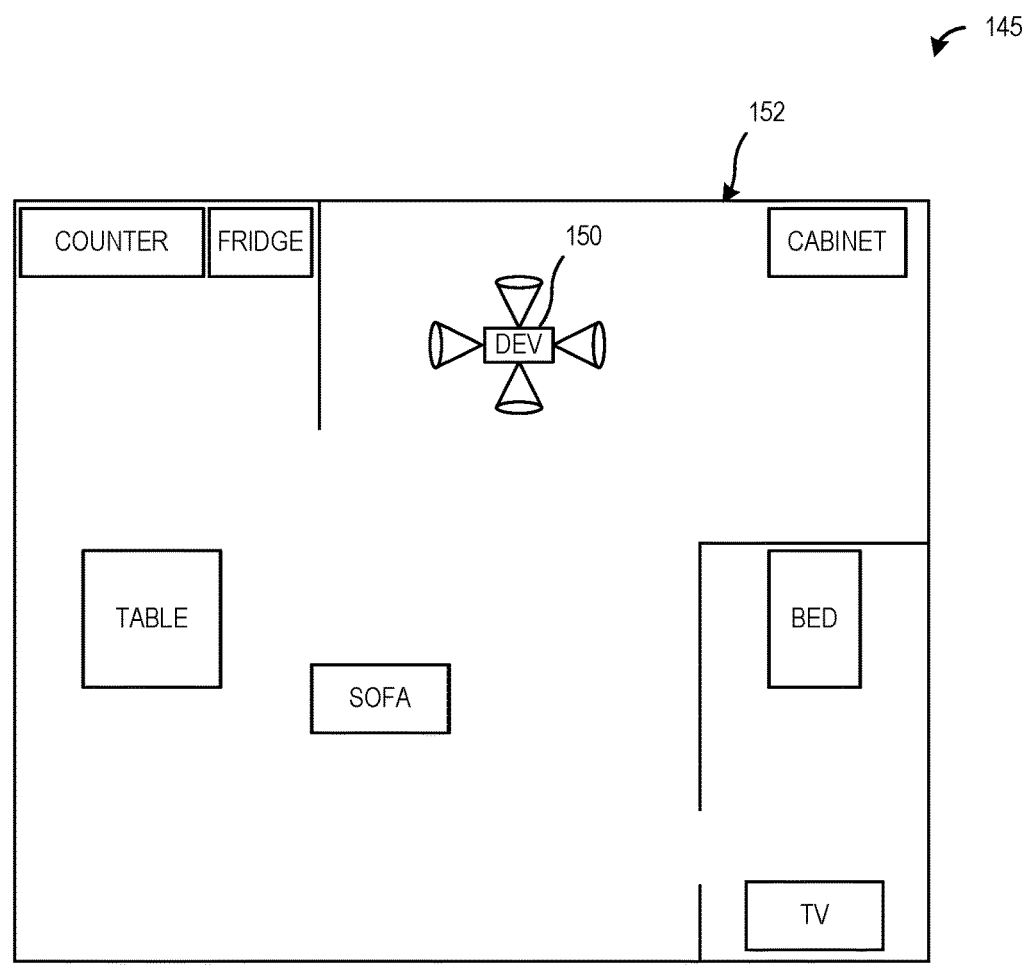

FIG. 1D illustrates a fourth example situation 145 involving the locating of an AD. In situation 145, the AD is a device iso. Device 150 is operating in a building 152. In order to operate effectively in building 152, device 150 has to determine the layout of building 152. Device 150 may use one or more sensors to determine the layout of building 152. Once the layout of building 152 is determined, device 150 uses the one or more sensors to locate itself within building 152, enabling movement through building 152 without collisions.

In general, an AD may have one or more sensors that can be used to help in the locating of the AD. The one or more sensors may utilize a wide range of techniques to locate the AD. An example locating technique uses satellite-based navigation information, such as the Global Positioning System (GPS), to locate the AD. In such a system, signals from multiple satellites are used to triangulate the location of the AD. Another example locating technique uses machine vision (i.e., image recognition), such as two-dimensional (2D) or three-dimensional (3D) machine vision, to locate the AD. In systems using machine vision, image processing techniques, such as edge detection, template matching, etc., are used to detect objects. Yet another example locating technique uses stereo vision that uses two sensors separated by a known distance to exploit geometry and determine object locations.

A relatively new locating technique uses time of flight (ToF) sensors, which measure the time between the transmission of an optical signal (or an electromagnetic signal) and the reception of reflections of the optical signal (or the electromagnetic signal), to determine object locations. A ToF sensor includes an emitter, such as a vertical-cavity surface-emitting laser (VCSEL) array to transmit the optical signals (e.g., in the infrared light range), and a receiver, such as a single-photon avalanche diode (SPAD) array, to receive reflections of the optical signals. The VCSEL array and the SPAD array may be small (e.g., on the order of a 4×4 array, an 8×8 array, or similar). The sizes of the VCSEL and SPAD arrays are much smaller than an image array used in image processing based locating techniques, where the image array may be on the order of megapixels or greater, for example. Advantages of ToF sensors include high locating resolution, low computational resource requirements, fast operation, and operable in low or poor light conditions. Additionally, because ToF sensors emit electromagnetic radiation, ToF sensors can operate independent of lighting conditions. Furthermore, ToF sensors are operable independent of the shape of the surface or objects.

According to an example embodiment, ToF sensors are used for AD locating. As discussed previously, ToF sensors offer high locating resolution, have low computational resource requirements, fast operation, and are capable of operating in low or poor light conditions. The high locating resolution of the ToF sensors enable the locating an AD to a level sufficient for a smooth landing, for example. The low computational resource requirements enable low cost, low power ADs to perform locating (as compared to techniques with high computational resource requirements, such as machine vision, which require the ADs to have significant computation resources (and hence, such ADs tend to be high cost and have high power consumption). The fast operation of the ToF sensors enables the locating to occur in real-time or super-real-time. The fast operation of the ToF sensors enable high refresh rates, which may be critical in real-time operations, such as collision avoidance, AD landing, etc. Operability in low or poor light conditions allow the ToF sensors to locate ADs at night or in the dark without requiring extra illumination, which may not be permissible with techniques that use visible light, depending on the deployment scenario.

An advantage of a preferred embodiment is that ToF sensors are capable of locating with a high degree of precision that is generally not available to satellite based positioning systems. Another advantage of a preferred embodiment is that ToF sensors are capable of locating while requiring a small amount of computational resources. Hence, locating with ToF sensors can be implemented in low cost, low power devices, or even within the self-contained capabilities of the ToF sensor itself.

According to an embodiment, a first ToF sensor is located in an AD and a second ToF sensor is located at another AD or an object to which the relative location of the AD is to be determined. As an example, if the AD is an UAV attempting to land on a landing pad (e.g., situation 100 of FIG. 1A), the first ToF sensor is located in the UAV and the second ToF sensor is located at the landing pad. As another example, if the AD is an autonomous vacuum cleaner finding its HB (e.g., situation 115 of FIG. 1B), the first ToF sensor is located in the autonomous vacuum cleaner and the second ToF sensor is in the HB. As yet another example, if the AD is a vehicle avoiding a collision with another vehicle (e.g., situation 130 of FIG. 1C), the first ToF sensor is located in the vehicle and the second ToF sensor is located in the other vehicle. In general, the second ToF sensor may be located at any position desired and does not have to be another device or AD. Although the discussion is presented with the AD having a single ToF sensor and the other AD or object having a single ToF sensor, the example embodiments presented herein are operable with each having one or more ToF sensors. Therefore, the discussion of a single ToF sensor at each of the AD and the other AD or object should not be construed as being limiting to the scope of the example embodiments.

According to an example embodiment, the relative location between two ToF sensors is determined. The relative location of one of two ToF sensors (with the first ToF sensor being located on the AD and the second ToF sensor being located on the other AD or object) is determined in accordance with measurements made by the ToF sensors. As an example, the relative location of one of two ToF sensors may be defined as a separation between the two ToF sensors along a single axis (e.g., a vertical axis orthogonal to landing pad 109 when situation 100 of FIG. 1A is being considered). As an example, the relative location of one of the two ToF sensors may be defined as a separation between the two ToF sensors along two axes (e.g., a first axis along road 139 and a second axis orthogonal to road 139 when situation 130 of FIG. 1C is being considered). As another example, the relative location of one of two ToF sensors may be defined as a separation between the two ToF sensors along three axes (e.g., a first axis orthogonal to landing pad 109, and second and third axes being two axes orthogonal to first axis when situation 100 of FIG. 1A is being considered).

According to an example embodiment, the first ToF sensor transmits an optical signal and makes measurements of the reflections of the optical signal reflecting off the other AD or object. The difference between the time of the transmission of the optical signal and the time of the reception of the reflections of the optical signal may be used to determine the separation between the AD and the other AD or object. Because a light emitting array (e.g., the VCSEL array) is used to transmit the optical signal and a sensor array (e.g., the SPADs array) is used to receive the reflections of the optical signal, multiple separation values are generated, which is referred to herein as a depth map.

In an embodiment, the second ToF sensor also transmits an optical signal and also makes measurements of the reflections of the optical signal reflecting off the AD. The second ToF sensor also generates a depth map, derived from its own measurements.

According to an example embodiment, the first and second ToF sensors communicate their respective depth maps. Communicating the depth maps includes transmitting and receiving depth maps. As an example, the first ToF sensor transmits its depth map and receives the depth map from the second ToF sensor. The first and second ToF sensors are within their respective field of views. As an example, the first and second ToF sensors communicate their respective depth maps by transmitting and receiving the depth maps using visible light communication (VLC). In VLC, the first ToF sensor utilizes its light emitting array to transmit its depth map, while the second ToF sensor utilizes its sensor array to receive the depth map of the first ToF sensor. The depth map of the second ToF sensor may be communicated in a similar manner. As another example, a wireless access technology is used by the first and second ToF sensors to communicate their respective depth maps. Examples of the wireless access technology include the IEEE 802.11 family of standards (WiFi), such as 802.11a/b/g/n/ac/ad/ax/ay/be, Bluetooth, IrDA, Ultrawideband (UWB), ZigBee, and so on.

According to an example embodiment, the first and second ToF sensors determine their relative locations in accordance with the depth maps. As an example, the first ToF sensor determines its location relative to the second ToF sensor based on its own depth map and the depth map communicated (e.g., transmitted) by the second ToF sensor. As an illustrative example, the first ToF sensor subtracts the depth map from the second ToF sensor from its own depth map to generate a difference map. The difference map may be used to determine the location of the first ToF sensor relative to the second ToF sensor. Because the difference map is generated from multiple depth maps, it is also known as a differential depth map or a delta map. Detailed discussions of example techniques for generating depth maps are provided below.

For discussion purposes, consider situation wo shown in FIG. 1A, where UAV 105 is landing on landing pad 109. In this situation, landing pad 109 will also include a ToF sensor. UAV 105 and landing pad 109 utilize ToF sensors, located on UAV 105 and landing pad 109, respectively, to determine the location of UAV 105 relative to landing pad 109 to assist UAV 105 land on landing pad 109. The ToF sensors implement the embodiment techniques presented herein to determine the location of UAV 105 relative to landing pad 109. Although the discussion focuses on situation wo of FIG. 1A, the example embodiments presented herein are operable in other situations (such as those presented in FIGS. 1B-1D, as well as other situations). Hence, the focus on landing a UAV on a landing pad should not be construed as being limiting to the scope of the example embodiments.

FIGS. 2A-2F illustrate an example UAV 105 landing on landing pad 109, where the relative location of UAV 105 is determined using ToF sensors located in UAV 105 and landing pad 109. ToF sensor 205 is located on landing pad 109, while the ToF sensor of UAV 105 is not shown in FIGS. 2A-2F to simplify the figures. ToF sensor 205 is located at the center of landing pad 109 and is oriented skyward. However, ToF sensor 205 may be located at any other desired location on landing pad. Because both UAV 105 and landing pad 109 have ToF sensors, it may not be necessary to illuminate landing pad 109, as would be necessary if a visual processing technique is used. Additionally, maintenance of landing pad 109 is not needed as long as TOF sensor 205 is clear.

Grid 211 represents the depth map generated by the ToF sensor of UAV 105, and grid 213 represents the depth map generated by ToF sensor 205 of landing pad 109. Each square of grid 211 and grid 213 are shaded to represent a range corresponding to a separation between the corresponding ToF sensor and an object reflecting the optical signal transmitted by the ToF sensor. As shown in FIGS. 2A-2F, an unshaded square represents an undefined range (implying that there was no reflected optical signal detected, hence there is no object in the field of view of the particular sensor of the sensor array). While a right leaning cross-hatch pattern represents a first degree of separation between UAV 105 and landing pad 109, a grid pattern represents a second degree of separation between UAV 105 and landing pad 109, a diagonal grid pattern represents a third degree of separation between UAV 105 and landing pad 109, a left leaning cross-pattern represents a fourth degree of separation between UAV 105 and landing pad 109, and a dark shading represents a fifth degree of separation between UAV 105 and landing pad 109, where the actual separation between UAV 105 and landing pad 109 decreases with increasing degree of separation, with the first degree of separation representing UAV 105 just entering detectable range and the fifth degree of separation representing UAV 105 almost being in contact with landing pad 109.

Figure 2A:
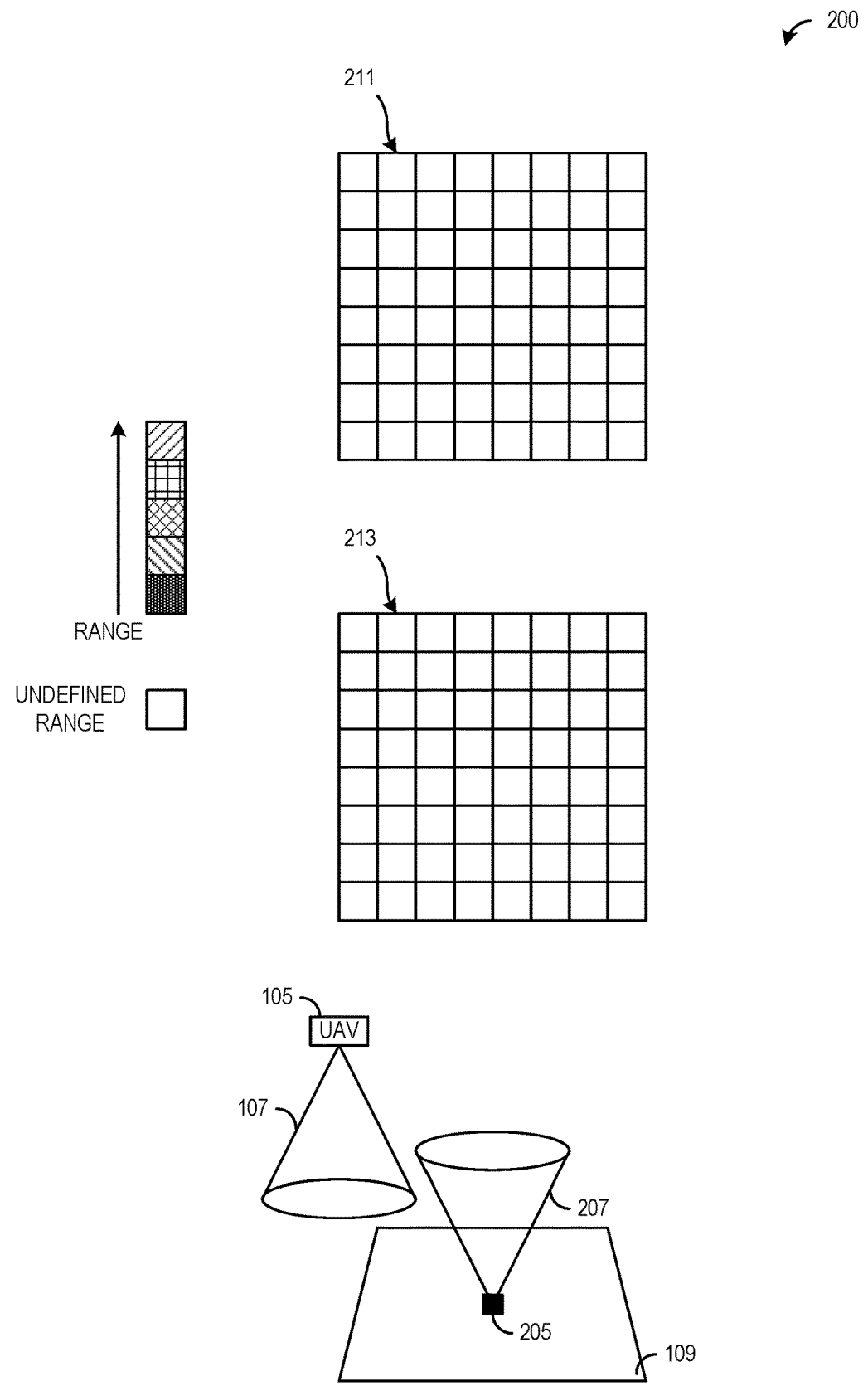
FIGS. 2A-2F illustrate an example unmanned aerial vehicle (UAV) landing on a landing pad, where the relative location of the UAV is determined using time of flight (ToF) sensors located in the UAV and the landing pad according to an embodiment.

As shown in FIG. 2A, UAV 105 and landing pad 109 are far apart, hence landing pad 109 is not in field of view 107 of the ToF sensor of UAV 105, and similarly, UAV 105 does not appear in field of view 207 of landing pad 109. Therefore, grids 211 and 213 are all clear in FIG. 2A. At this distance, UAV 105 may use a less precise locating technique, such as satellite-based navigation information, homing beacons, etc., to navigate towards landing pad 109.

Figure 2B:
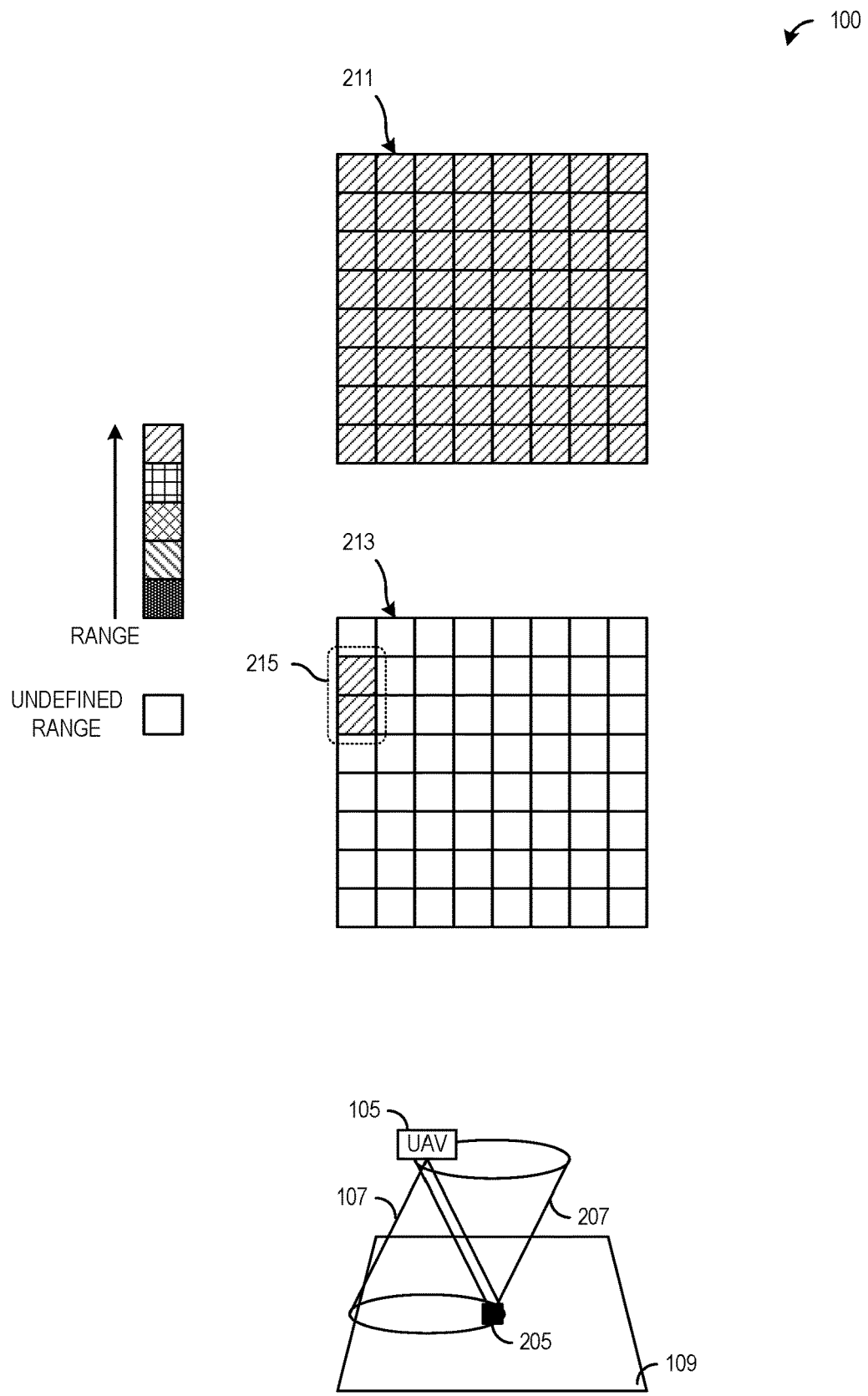

As shown in FIG. 2B, UAV 105 has moved closer to landing pad 109, and landing pad 109 has entered field of view 107 of the ToF sensor of UAV 105. Similarly, UAV 105 has partially entered field of view 207 of ToF sensor 205 of landing pad 109. Because landing pad 109 has entered field of view 107 of the ToF sensor of UAV 105, but is still far away, the squares of grid 211 are shaded to indicate a first degree of separation between UAV 105 and landing pad 109. The squares of grid 211 may all be shaded because landing pad 109 is so large compared to UAV 105 and landing pad 109 occludes all of the sensors of the ToF sensor of UAV 105.

Additionally, because UAV 105 has just started to enter field of view 207 of ToF sensor 205, only a few squares (i.e., squares 215) are shaded with the right leaning cross-hatch pattern, while the remaining squares are clear. Clearly, the depth map generated from measurements of ToF sensor 205 indicates that UAV 105 has just entered field of view 207. Hence, UAV 105 can adjust its flight to become better centered over ToF sensor 205 if it has knowledge of the depth map generated from measurements of ToF sensor 205. As shown in FIG. 2B, UAV 105 is moving from left to right (from the perspective of landing pad 109), squares 215 are located at the left side of grid 213. Because UAV 105 is detected on the left side of grid 213, UAV 105 may continue to move towards the right side of landing pad 109 to better center itself over ToF sensor 205. Furthermore, squares 215 are located above a midline of the depth map associated with ToF sensor 205 (as displayed in grid 213), therefore, to center itself over ToF sensor 205, UAV 105 adjusts its flight so that it continues to move towards the right and bottom sides of landing pad 109.

Figure 2C:
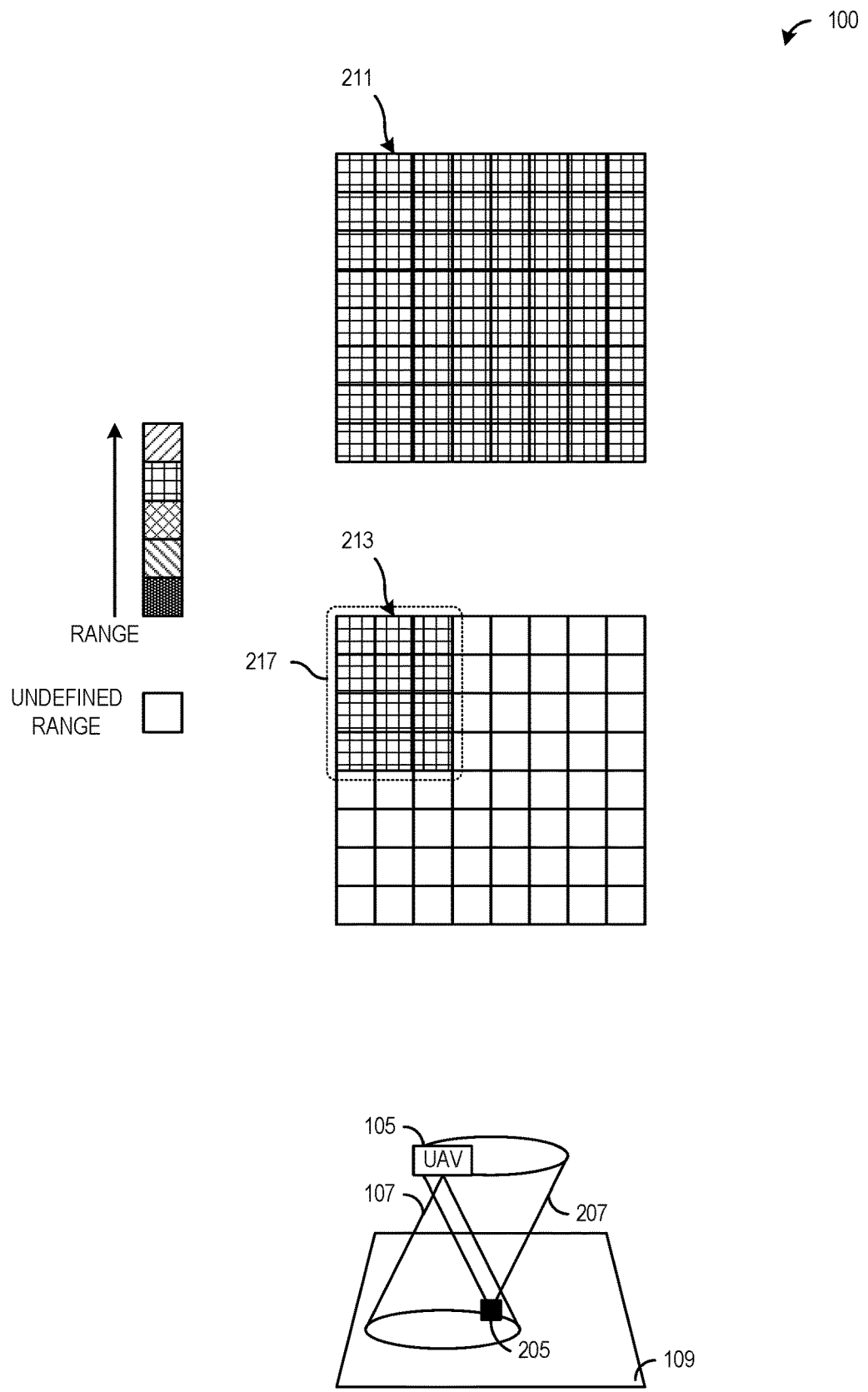

As shown in FIG. 2C, UAV 105 has moved even closer to landing pad 109, and has entered a larger portion of field of view 207 of ToF sensor 205 of landing pad 109. Because landing pad 109 has entered field of view 107 of the ToF sensor of UAV 105, but has come closer, the squares of grid 211 are shaded to indicate a second degree of separation between UAV 105 and landing pad 109. Because UAV 105 has come closer to landing pad 109 and has entered a larger portion of field of view 207, a greater number of squares (i.e., squares 217) are shaded with the grid pattern, while the remaining squares are clear. Because UAV 105 is moving from left to right and from top to bottom (from the perspective of landing pad 109), squares 217 are located at the left-top side of grid 213. Because UAV 105 is now detected on a greater number of squares of the left side of grid 213, UAV 105 may continue to move towards the right and bottom sides of landing pad 109 to center itself over ToF sensor 205.

Figure 2D:
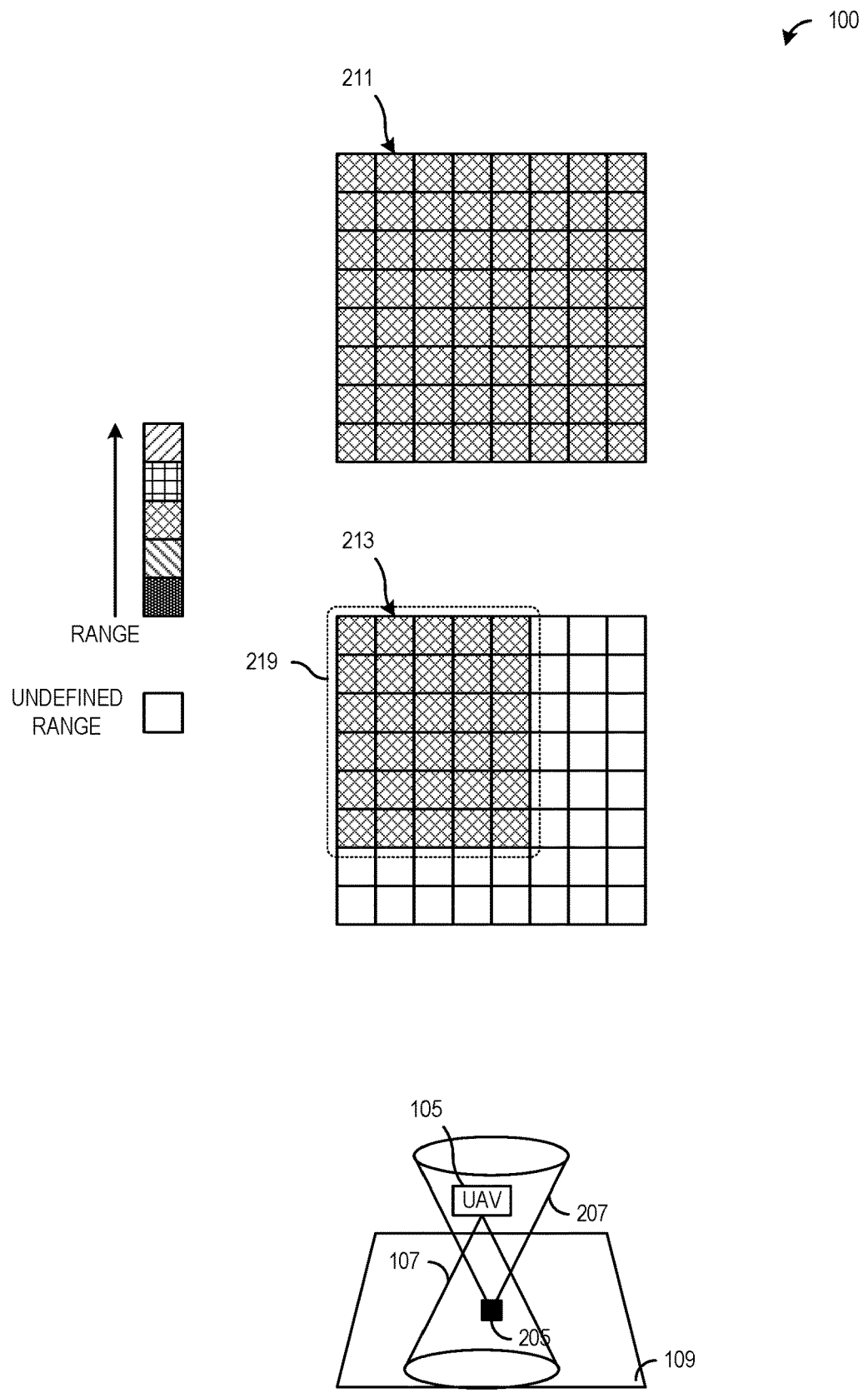

As shown in FIG. 2D, UAV 105 has moved even closer to landing pad 109, and has entered a larger portion of field of view 207 of ToF sensor 205 of landing pad 109. Because landing pad 109 has entered field of view 107 of the ToF sensor of UAV 105, but has come even closer, the squares of grid 211 are shaded to indicate a third degree of separation between UAV 105 and landing pad 109. Because UAV 105 has come closer to landing pad 109 and has entered a larger portion of field of view 207, a greater number of squares (i.e., squares 219) are shaded with the diagonal grid pattern, while the remaining squares are clear. Because UAV 105 is moving from left to right and from top to bottom (from the perspective of landing pad 109), squares 219 are located at the left side of grid 213. Because UAV 105 is now detected on even a greater number of squares of the left-top side of grid 213, UAV 105 may continue to move towards the right and bottom sides of landing pad 109 to center itself over ToF sensor 205.

Figure 2E:
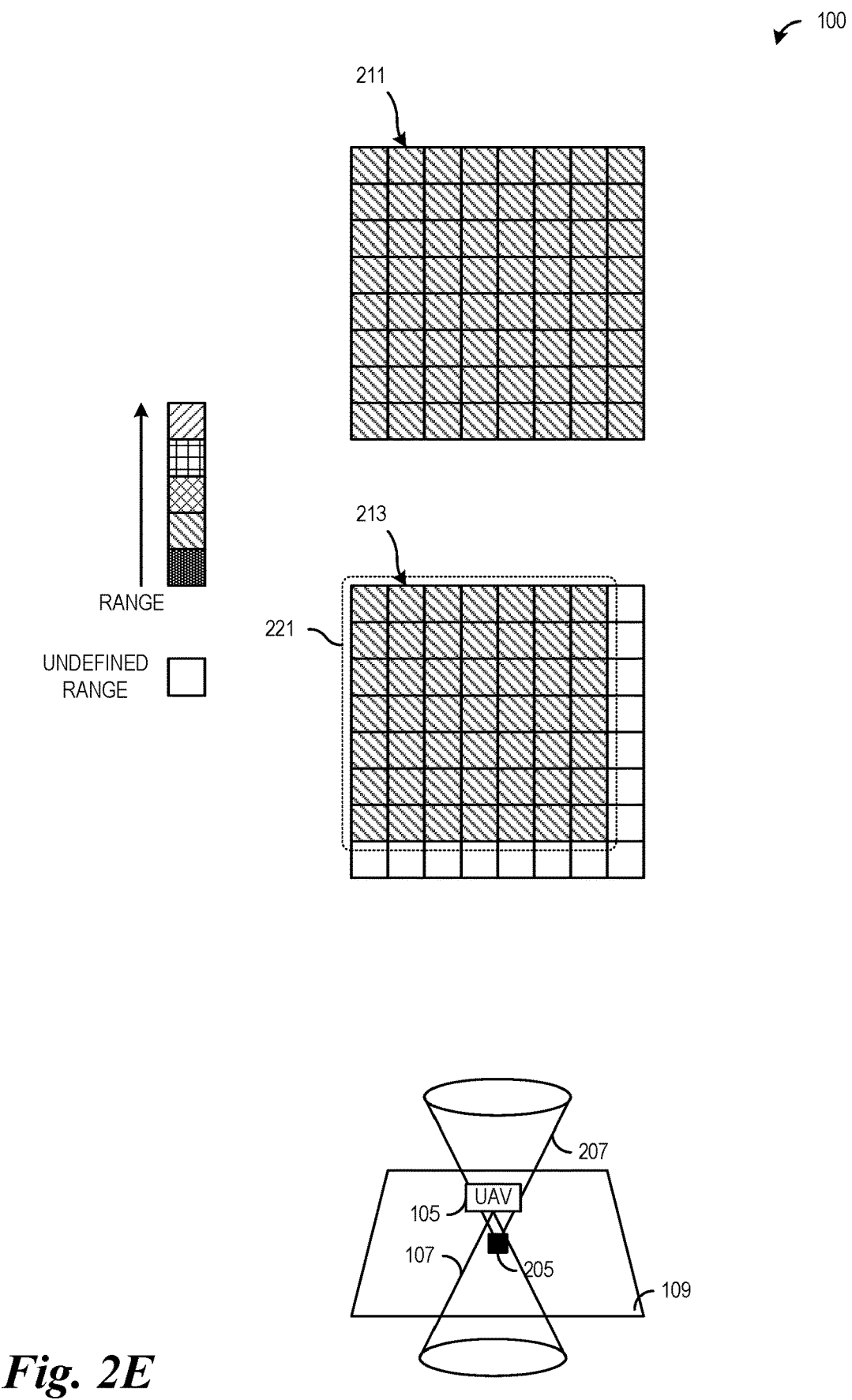

As shown in FIG. 2E, UAV 105 has moved even closer to landing pad 109, and has entered a larger portion of field of view 207 of ToF sensor 205 of landing pad 109. Because landing pad 109 has entered field of view 107 of the ToF sensor of UAV 105, but has come even closer, the squares of grid 211 are shaded to indicate a fourth degree of separation between UAV 105 and landing pad 109. Because UAV 105 has come closer to landing pad 109 and has entered a larger portion of field of view 207, a greater number of squares (i.e., squares 221) are shaded with the left leaning grid pattern, while the remaining squares are clear. Because UAV 105 is moving from left to right and from top to bottom (from the perspective of landing pad 109), squares 221 are located at the left-top side of grid 213. Because UAV 105 is now detected on almost all of the squares of the left side of grid 213, UAV 105 may continue to move towards the right side of landing pad 109 to center itself over ToF sensor 205.

Figure 2F:
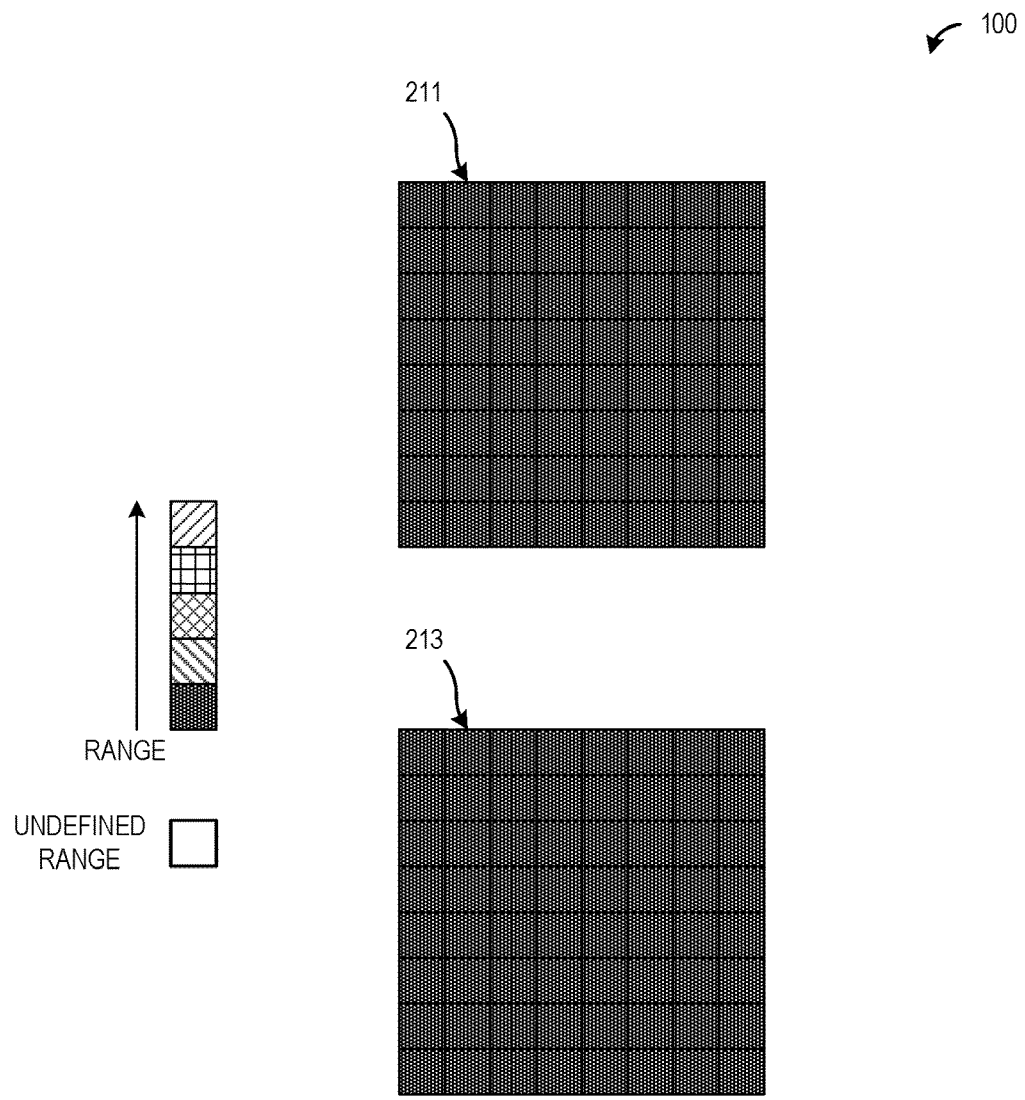
Figure 2F:
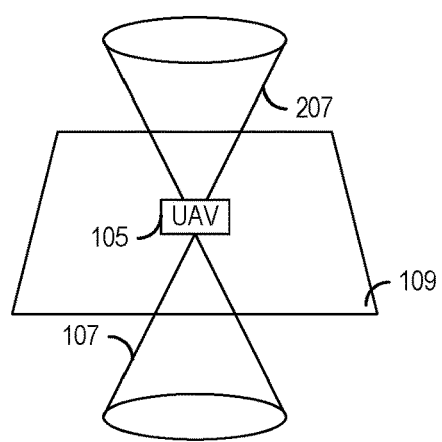

As shown in FIG. 2F, UAV 105 has landed on ToF sensor 205 of landing pad 109. Because UAV 105 has landed on ToF sensor 205 (which is not shown in FIG. 2F), the squares of grid 211 and 213 are shaded to indicate a fifth degree of separation between UAV 105 and landing pad 109. UAV 105 has landed fully on ToF sensor 205, so the squares of grid 213 are shaded to indicate that all of the sensors of ToF sensor 205 are occluded by UAV 105.

As presented in FIGS. 2A-2F, the depth maps generated by the ToF sensor of UAV 105 and ToF sensor 205 of landing pad 109 are used to determine the location of UAV 105 relative to landing pad 109. The information in the depth maps may also be used to help UAV 105 adjust its flight to land on ToF sensor 205. Detailed discussions of example techniques for generating depth maps and how to adjust the movement of UAV 105 are provided below.

According to an example embodiment, the movement of the AD is adjusted in accordance with the relative location. As an example, if the relative location indicates that the two ToF sensors (one of which is located on the AD) are far apart in a single dimension, the AD may adjust its movement to bring the two ToF sensors closer together. As another example, if the relative location indicates that the two ToF sensors are far apart and misaligned in two or three dimensions, the AD may adjust its movement to bring the two ToF sensors closer together and to eliminate the misalignment between the two ToF sensors.

According to an example embodiment, the ToF sensors perform the locating and information communicating. Due to the low computational resource requirements associated with locating using ToF sensors, the ToF sensors may have sufficient computational resources to perform the locating and information communicating without having to depend upon external computational resources. As an example, a ToF sensor attached to an object has sufficient computational resources, such as a microcontroller located within the ToF sensor, etc., to perform locating without requiring the addition of an external computational resource to perform the locating. As another example, a ToF sensor attached to a UAV would not need to tap into the computational resources of the UAV to perform the locating.

According to an example embodiment, the ToF sensors operate in a cyclic manner. In an embodiment, a single locating cycle comprises transmitting optical signals, measuring reflections of the optical signals, determining depth maps, communicating depth maps, and locating the ToF sensor. The ToF repeats the locating cycle. The locating cycles may continue indefinitely. Alternatively, the locating cycles may continue until a condition is met. As an example, UAV 105 may stop the locating cycle once UAV 105 successfully lands on landing pad 109. As another example, vehicle 135 may continuous perform locating cycles until vehicle 135 has parked and powered down. In another example, vehicle 135 continues to perform locating cycles, even when vehicle 135 is powered down and not moving, to potentially prevent other vehicles from colliding with vehicle 135, for example.

Figure 3:
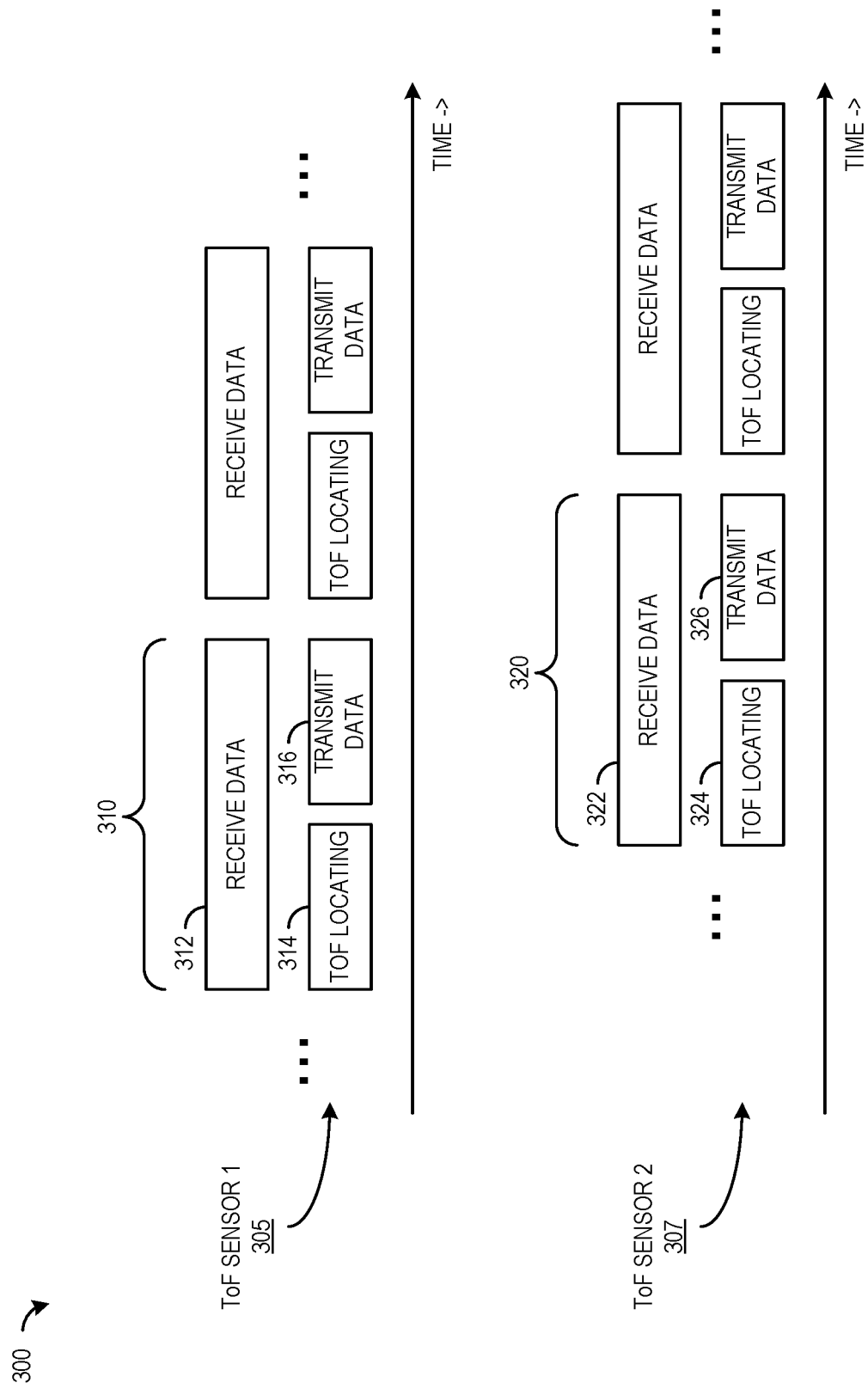
FIG. 3 illustrates a diagram of example locating cycles occurring at a first ToF sensor and a second ToF sensor according to an embodiment.

FIG. 3 illustrates a diagram 300 of example locating cycles occurring at a first ToF sensor 305 and a second ToF sensor 307. At first ToF sensor 305, a single locating cycle 310 includes first ToF sensor 305 performing a receiving data phase 312, a performing locating phase 314, and a transmitting data phase 316. During receiving data phase 312, first ToF sensor 305 is capable of receiving depth maps from ToF sensors that are in close proximity to first ToF sensor 305, such as second ToF sensor 307, for example. During ToF locating phase 314, first ToF sensor 305 performs locating, which includes transmitting optical signals, measuring reflections of the optical signals, and determining a depth map from the measurements. During transmitting data phase 316, first ToF sensor 305 transmits the depth map to second ToF sensor 307, for example.

At second ToF sensor 307, similar locating cycles are performed. As an example, locating cycle 320 includes second ToF sensor 307 performing a receiving data phase 322, a performing locating phase 324, and a transmitting data phase 326. The locating cycles performed by the ToF sensors 305 and 307 may be offset in time to ensure that one of the ToF sensors is receiving data when the other ToF sensor is transmitting data, and vice versa. Alternatively, the locating cycles are synchronous in nature, but a collision detection mechanism is implemented so that should the transmissions of the ToF sensors collide, the collision is detected and recovery occurs.

In an embodiment, a ToF sensor determines its location relative to another ToF sensor. Due to the low computation resource requirements of determining relative location, it is possible for a ToF sensor to determine its location relative to another ToF by itself, without requiring computational resources of an external device.

Figure 4A:
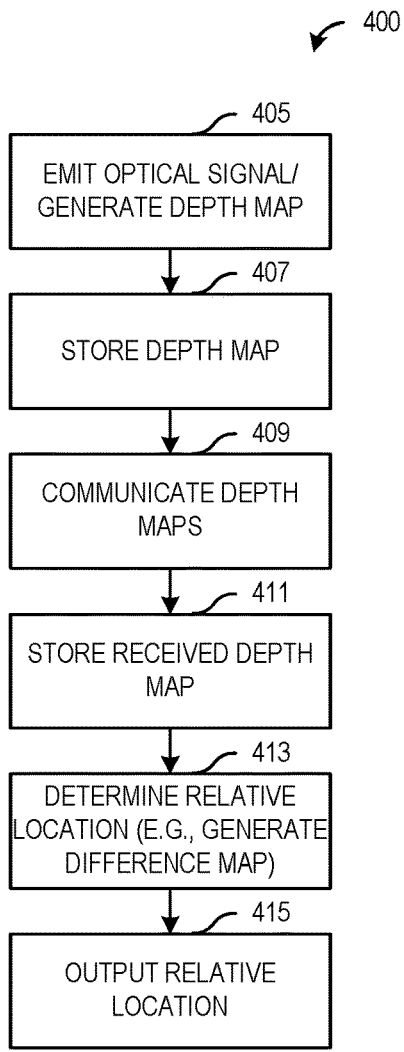
FIG. 4A illustrates a flow diagram of example operations occurring in a ToF sensor according to an embodiment.

FIG. 4A illustrates a flow diagram of example operations 400 occurring in a ToF sensor. Operations 400 may be indicative of operations occurring in a ToF sensor as the ToF sensor determines its location relative to another ToF sensor.

Operations 400 begin with the ToF sensor emitting optical signals and generating a depth map (block 405). Although the discussion focuses on optical signals, the example embodiments presented herein are operable with other forms of electromagnetic radiation. The ToF sensor may use a VCSEL array to emit the optical signals, and a SPAD array to make measurements of reflections of the optical signals. Time differences of the time when the optical signals are transmitted and when the reflections of the optical signals are received are used to determine the depth (or distance) from the ToF sensor and the objects from which the optical signals are reflecting. The ToF sensor stores the depth map (block 407). The TOF sensor may store the depth map in a memory of the ToF sensor. Because the SPAD array is small (e.g., on the order of a 4×4 array, an 8×8 array, and so on), not much memory is required.

The ToF sensor communicates the depth map (block 409). The ToF sensor communicates the depth maps with other ToF sensors, for example. Communicating the depth maps includes transmitting and receiving the depth maps. The ToF sensor may transmit the depth map using VLC, for example. In an embodiment, the ToF sensor may use the VCSEL array or a subset of the VCSEL array to transmit the depth map. The other ToF sensors may use the SPAD array or a subset of the SPAD array to receive the depth map. The other ToF sensors may also communicate their depth data with the ToF sensor. Alternatively, the ToF sensor uses a wireless access technology to communicate the depth map. The ToF sensor stores the depth maps received from the other ToF sensors (block 411).

The ToF sensor determines its relative location (block 413). The ToF sensor may determine its relative location in accordance with its own depth map and the depth maps received from the other ToF sensors. As an example, consider a case where the ToF sensor receives a depth map from one other ToF sensor. In such a situation, the ToF sensor may determine its location relative to the other ToF sensor by determining a difference between its depth map and the depth map received from the other ToF sensor. The information is referred to as a difference map. For example, the ToF sensor simply subtracts the depth map received from the other ToF sensor from its own depth map. Detailed discussions of example techniques for determining relative location from depth maps are provided below.

The ToF sensor outputs the relative location (block 415). The ToF sensor provides the relative location to an AD that can make use of the relative location, for example. As an example, in situation 100 of FIG. 1A, the ToF sensor provides the relative location to UAV 105, and UAV 105 may adjust its flight to land on landing pad 109. As another example, in situation 130 of FIG. 1C, the ToF sensor provides the relative location to vehicle 135, and vehicle 135 may apply the brakes to avoid hitting vehicle 141 (or vehicle 135 may steer around vehicle 141). Operations 400 may be repeated continuously so that the relative location is frequently updated.

Figure 4B:
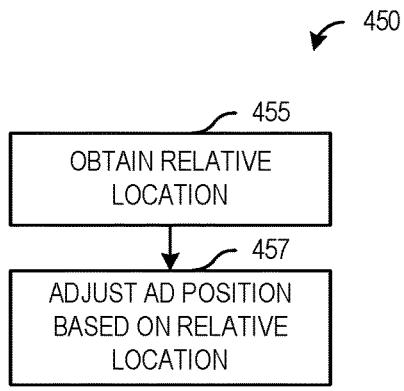
FIG. 4B illustrates a flow diagram of example operations occurring in an autonomous device (AD) according to an embodiment.

FIG. 4B illustrates a flow diagram of example operations 450 occurring in an AD. Operations 450 may be indicative of operations occurring in an AD as the AD makes use of its relative location.

Operations 450 begin with the AD obtaining the relative location (block 455). The relative location may be obtained from a ToF sensor located in or on the AD, for example. The relative location may be retrieved from a memory location written to by the ToF sensor. The AD adjusts the location based on the relative location (block 457). In an embodiment, the AD adjusts the location based on the relative location. Alternatively, the AD adjusts the location based on differences in the relative location. As an example, if successive relative location information indicates that the AD is approaching an object, the AD may adjust its location to avoid the object (in a collision avoidance system, for example) or to come closer to the object (in a UAV landing system, for example). Detailed discussions of adjusting the location based on the relative location are provided below.

In an embodiment, rather than determining its relative location, the ToF sensor provides depth data to another device (e.g., an AD) and the device determines the relative location. Allowing another device to determine the relative location may simplify the ToF sensor design, allowing for a simple ToF sensor with low power requirements. Furthermore, the ToF sensor no longer has to be able to communicate with other ToF sensors, which will further simplify ToF sensor design and reduce power consumption.

Figure 5A:
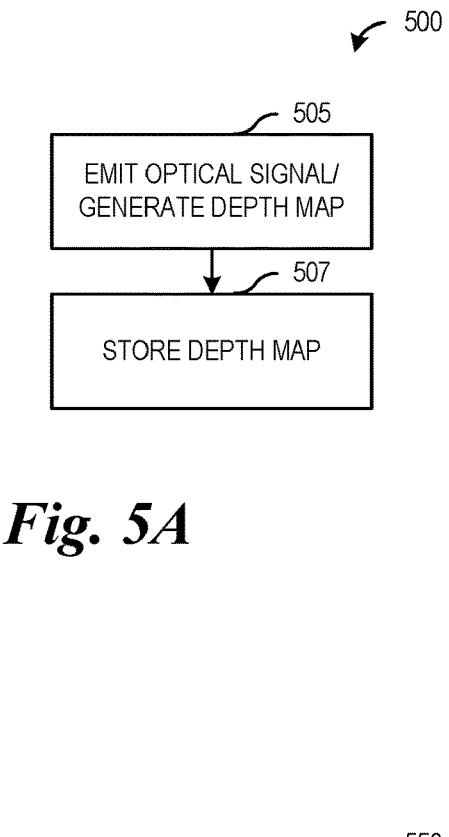
FIG. 5A illustrates a flow diagram of example operations occurring in a ToF sensor as the ToF sensor offloads the relative location determination to another device according to an embodiment.

FIG. 5A illustrates a flow diagram of example operations 500 occurring in a ToF sensor as the ToF sensor offloads the relative location determination to another device. Operations 500 may be indicative of operations occurring in a ToF sensor as the ToF sensor offloads, to another device, the determining of the relative location.

Operations 500 begin with the ToF sensor emitting optical signals and generating a depth map (block 505). The ToF sensor may use a VCSEL array to emit the opticals and a SPAD array to make measurements of reflections of the optical signals. Time differences of the time when the optical signals are transmitted to when the reflections of the optical signals are received are used to determine the depth (or distance) from the ToF sensor and the objects from which the optical signals are reflecting. The ToF sensor stores the depth map (block 507). The TOF sensor may store the depth map in a memory of the ToF sensor. Because the SPAD array is small (e.g., on the order of a 4×4 array or an 8×8 array), not much memory is required.

Figure 5B:
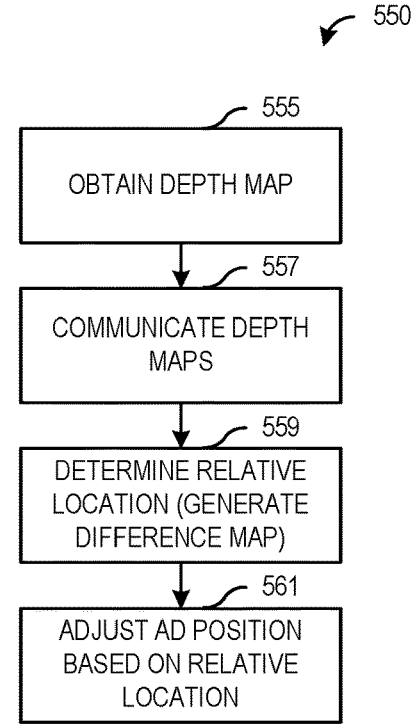
FIG. 5B illustrates a flow diagram of example operations occurring in an AD performing the determining of the relative location of a ToF sensor according to an embodiment.

FIG. 5B illustrates a flow diagram of example operations 550 occurring in an AD performing the determining of the relative location of a ToF sensor. Operations 550 may be indicative of operations occurring in an AD as the AD performs the determining of the relative location of a ToF sensor utilizing depth maps provided by the ToF sensor.

Operations 550 begin with the AD obtaining the depth map (block 555) The depth map may be obtained from a ToF sensor located in or on the AD, for example. The depth map may be retrieved from a memory location written to by the ToF sensor. The AD communicates the depth map (block 557). The AD communicates the depth with other ToF sensors, for example. The AD may use a wireless access technology to communicate the depth map. Alternatively, the AD uses VLC to communicate the depth map.

The AD determines its relative location (block 559) The AD may determine its relative location in accordance with its own depth map and the depth maps received from the other ToF sensors. As an example, consider a case where the AD receives a depth map from one other ToF sensor. In such a situation, the AD may determine its location relative to the other ToF sensor by determining a difference between its depth map and the depth map received from the other ToF sensor. The information is referred to as a difference map. For example, the AD simply subtracts the depth map received from the other ToF sensor from its own depth map. Detailed discussions of example techniques for determining relative location from depth maps are provided below.

The AD adjusts the location based on the relative location (block 561). In an embodiment, the AD adjusts the location based on the relative location. Alternatively, the AD adjusts the location based on differences in the relative location. As an example, if successive relative location information indicates that the AD is approaching an object, the AD may adjust its location to avoid the object (in a collision avoidance system, for example) or to come closer to the object (in a UAV landing system, for example). Detailed discussions of adjusting the location based on the relative location are provided below.

Figure 6F:
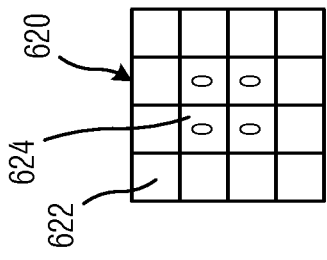
FIGS. 6A-6K illustrate diagrams of an example first situation involving the UAV and the landing pad, as well as depth maps and difference maps associated therewith according to an embodiment.
Figure 6D:
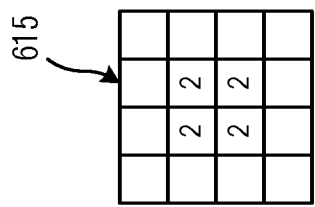
Figure 6B:
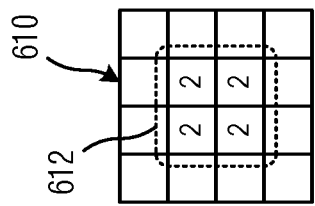
Figure 6G:
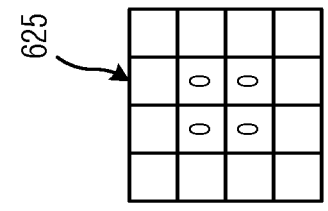
Figure 6E:
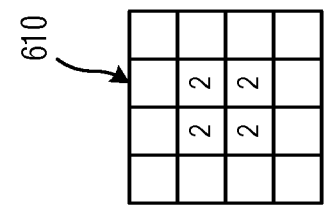
Figure 6C:
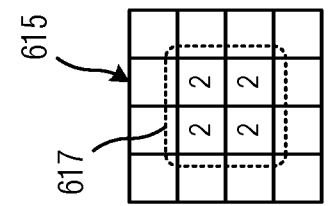
Figure 6A:
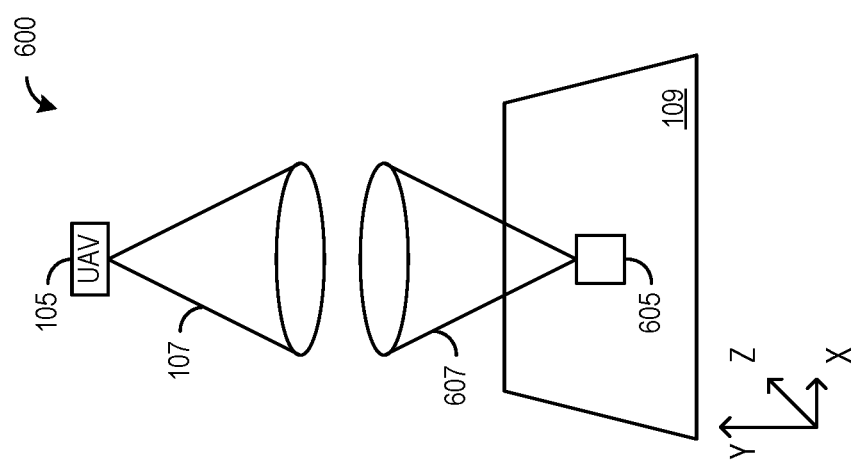

FIG. 6A illustrates a first example situation 600 involving UAV 105 utilizing relative location determined using ToF sensors to land on landing pad 109. UAV 105 includes a ToF sensor (not shown in FIG. 6a to simplify the figure) with field of view 107, while landing pad 109 includes a ToF sensor 605 with a field of view 607. As shown in situation 600, UAV 105 is located directly above ToF sensor 605 (i.e., in the +Y direction).

FIG. 6B illustrates a grid 610 representing a depth map derived from measurements made by the ToF sensor of UAV 105. Because UAV 105 is located directly above ToF sensor 605 of landing pad 109, reflections of the optical signals emitted by the ToF sensor of UAV 105 are detected by central sensors of the ToF sensor of UAV 105, which are shown in FIG. 6B as squares 612. The values in squares 612 represent the distance between the ToF sensor of UAV 105 and ToF sensor 605 of landing pad 109, where a "2" indicates that UAV 105 and landing pad 109 are far away.

FIG. 6C illustrates a grid 615 representing a depth map derived from measurements made by ToF sensor 605 of landing pad 109. Because landing pad 109 is located directed below UAV 105, reflections of the optical signals emitted by ToF sensor 605 are detected by central sensors of ToF sensor 605, which are shown in FIG. 6C as squares 617. The values in squares 617 represent the distance between ToF sensor 605 and the ToF sensor of UAV 105.

FIG. 6D illustrates the depth map derived from measurements made by ToF sensor 605 of landing pad 109 (grid 615) received from ToF sensor 605. FIG. 6E illustrates the depth map derived from measurements made by the ToF sensor of UAV 105 (grid 610) received from the ToF sensor of UAV 105.

FIG. 6F illustrates a difference map derived by the ToF sensor of UAV 105. The difference map, shown as grid 620, is derived by the ToF sensor of UAV 105 may be determined by subtracting the values of the depth map (i.e., grid 615) derived from measurements made by ToF sensor 605 of landing pad 109 from the values of the depth map (i.e., grid 610) derived from measurements made by ToF sensor of UAV 105. As shown in grid 620, the difference of squares with undefined values, such as square 622, remain undefined. The difference of squares with the same values, such as square 624, is zero "0".

The difference map may be used to adjust the movement of UAV 105 to land UAV 105 directly over ToF sensor 605 of landing pad 109. Because ToF sensor 605 is located in the center of grid 620, UAV 105 is already centered over ToF sensor 605, UAV 105 only has to decrease its altitude without having to change lateral position.

An example rule for determining the value of a square in the difference map generated from a first depth map and a second depth may be as follows (however, other rules may be used):

if corresponding squares of both depth maps are defined, then the corresponding square of the difference map is equal to the difference of the first value minus the second value;

if the value of a square of the first depth map is defined and the value of a corresponding square of the second depth map is undefined, then the value of the corresponding square of the difference map is equal to the value of the square of the first depth map; and if the value of a square of the first depth map is undefined and the value of a corresponding square of the second depth map is defined, then the value of the corresponding square of the difference map is undefined.

FIG. 6G illustrates a difference map derived by ToF sensor 605 of landing pad 109. The difference map, shown as grid 625, derived by ToF sensor 605 of landing pad 109 may be determined by subtracting the values of the depth map (i.e., grid 610) derived from measurements made by ToF sensor of UAV 105 from the values of the depth map (i.e., grid 615) derived from measurements made by ToF sensor 605 of landing pad 109.

Figure 6K:
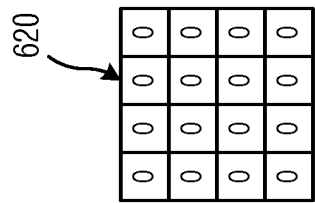
Figure 6J:
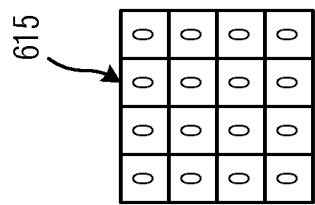
Figure 6I:
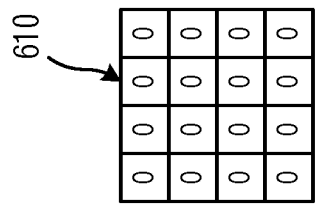
Figure 6H:
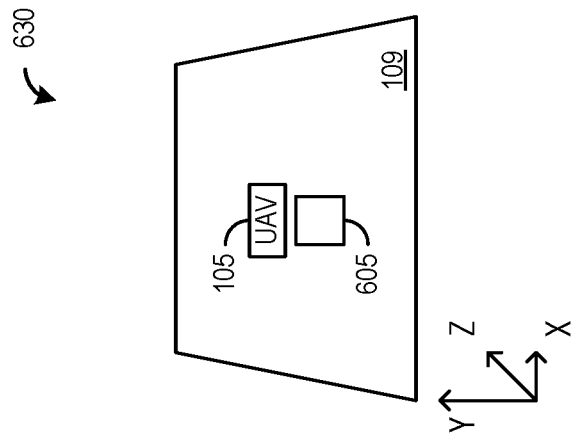

FIG. 6H illustrates an example situation 630 involving UAV 105 landing on ToF sensor 605 of landing pad 109, where situation 630 represents a later instance in time of situation 600. As shown in situation 630, UAV 105 has landed directly on top of ToF sensor 605 of landing pad 109. FIG. 6I illustrates grid 610 representing a depth map derived from measurements made by the ToF sensor of UAV 105 when UAV 105 has landed on landing pad 109. Because UAV 105 has landed on ToF sensor 605 of landing pad 109, reflections of optical signals emitted by the ToF sensor of UAV 105 are detected by all sensors of ToF sensor of UAV 105. The values in the squares of grid 610 represent the distance between the ToF sensor of UAV 105 and ToF sensor 605 of landing pad 109, where a "0" indicates that UAV 105 and landing pad 109 are very close (substantially touching one another).

FIG. 6J illustrates grid 615 representing a depth map derived from measurements made by ToF sensor 605 of landing pad 109 when UAV 105 has landed on landing pad 109. Because UAV 105 has landed on ToF sensor 605 of landing pad 109, reflections of optical signals emitted by ToF sensor 605 of landing pad 109 are detected by all sensors of ToF sensor 605 of landing pad 109. The values in the squares of grid 615 represent the distance between the ToF sensor of UAV 105 and ToF sensor 605 of landing pad 109.

FIG. 6K illustrates grid 620 representing a difference map derived from depth maps. Grid 620 represents the difference map derived by the ToF sensor of UAV 105, for example, where a difference is determined between the depth map (grid 610) derived by the ToF sensor of UAV 105 and the depth map (grid 615) derived by ToF sensor 605 of landing pad 109. Because UAV 105 has landed directly on ToF sensor 605 of landing pad 109, the values of grid 620 are all zeroes.

FIG. 7A illustrates a second example situation 700 involving UAV 105 utilizing relative location determined using ToF sensors to land on landing pad 109, where UAV 105 is arriving at landing pad 109 in a diagonal direction. UAV 105 includes a ToF sensor (not shown in FIG. 7a to simplify the figure) with field of view 107, while landing pad 109 includes a ToF sensor 605 with a field of view 607. As shown in situation 700, UAV 105 is offset from ToF sensor 605 in the −X, +Y, and +Z directions.

FIG. 7B illustrates grid 610 representing a depth map derived from measurements made by the ToF sensor of UAV 105. Because UAV 105 is located above, behind, and to the left of ToF sensor 605 of landing pad 109, reflections of the optical signals emitted by the ToF sensor of UAV 105 are detected by the lower right sensors of the ToF sensor of UAV 105, which are shown in FIG. 7B as squares 705. The values in squares 705 represent the distance between the ToF sensor of UAV 105 and ToF sensor 605 of landing pad 109, where a "2" indicates that UAV 105 and landing pad 109 are far away.

FIG. 7C illustrates grid 615 representing a depth map derived from measurements made by ToF sensor 605 of landing pad 109. Because landing pad 109 is located below, in front, and to the right of UAV 105, reflections of the optical signals emitted by ToF sensor 605 are detected by the upper left sensors of ToF sensor 605, which are shown in FIG. 7C as squares 710. The values in squares 710 represent the distance between ToF sensor 605 and the ToF sensor of UAV 105.

FIG. 7D illustrate the depth map derived from measurements made by ToF sensor 605 of landing pad 109 (grid 615) received from ToF sensor 605. FIG. 7E illustrates the depth map derived from measurements made by the ToF sensor of UAV 105 (grid 610) received from the ToF sensor of UAV 105.

FIG. 7F illustrates a difference map derived by the ToF sensor of UAV 105. The difference map, shown as grid 620, is derived by the ToF sensor of UAV 105 may be determined by subtracting the values of the depth map (i.e., grid 615) derived from measurements made by ToF sensor 605 of landing pad 109 from the values of the depth map (i.e., grid 610) derived from measurements made by ToF sensor of UAV 105. As shown in grid 620, the difference of a square with an undefined value (e.g., squares 706) from a square with an actual value (e.g., squares 705) is equal to the actual value (e.g., squares 715). Furthermore, the difference of a square with an actual value (e.g., squares 707) from a square with an undefined value (e.g., squares 708) is an undefined value (e.g., squares 709). From the difference map (grid 620), UAV 105 is able to make adjustments to its position in accordance to a position control algorithm. As an example, the position control algorithm may be to center the squares with values and to make all of the squares zero. In order to accomplish this, UAV 105 adjust its position in accordance with a vector 717, which adjusts the position of UAV 105 in the +X, −Y, and −Z directions.

FIG. 7G illustrates a difference map derived by ToF sensor of landing pad. The difference map, shown as grid 625, derived by ToF sensor 605 of landing pad 109 may be determined by subtracting the values of the depth map (i.e., grid 610) derived from measurements made by the ToF sensor of UAV 105 from the values of the depth map (i.e., grid 615) derived from measurements made by ToF sensor 605 of landing pad 109. Grid 625 includes squares 720 with actual values, while other squares are undefined. Although landing pad 109 is generally immobile, a situation may arise where landing pad 109 is mobile. In such a situation, landing pad 109 may make adjustments to its position (in a manner similar to UAV 105 described above). In such a situation, landing pad 109 may adjust its position in accordance with a vector 722, which adjusts the position of landing pad 109 in the −X, +Y, and +Z directions.

Figure 7K:
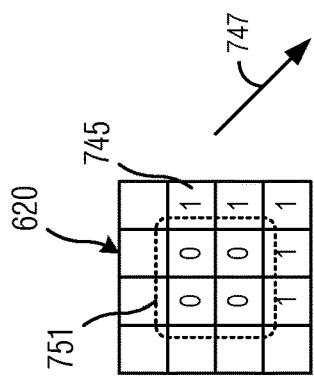
Figure 7J:
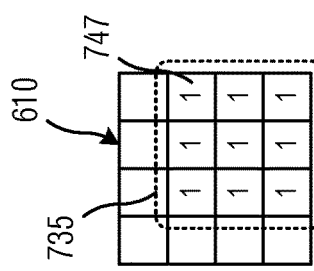
Figure 7I:
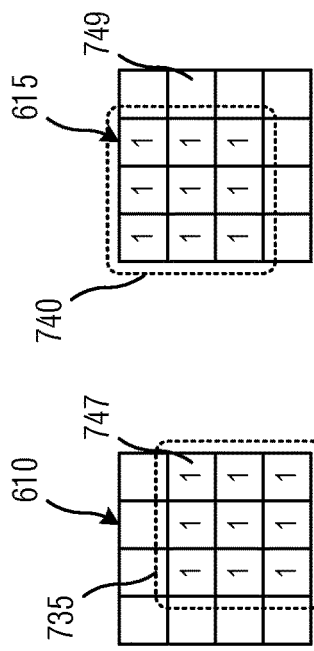
Figure 7H:
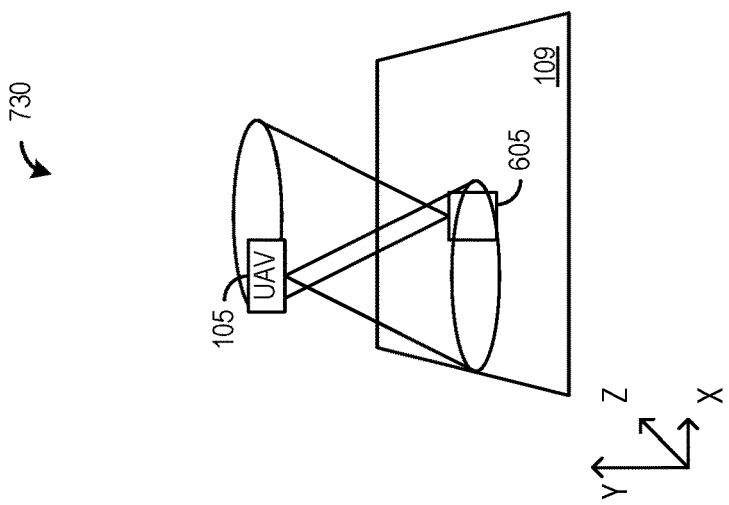

FIG. 7H illustrates an example situation 730 involving UAV 105 utilizing relative location determined using ToF sensors to land on landing pad 109, where situation 730 represents a later time instance of situation 700. As shown in situation 730, UAV 105 has moved closer to ToF sensor 605 of landing pad 109, but remains above, behind, and to the left of ToF sensor 605 of landing pad 109.

FIG. 7I illustrates grid 610 representing a depth map derived from measurements made by the ToF sensor of UAV 105 when UAV 105 is located as shown in situation 730. Because UAV 105 has moved closer to ToF sensor 605 and has better centered itself over ToF sensor 605, reflections of optical signals emitted by the ToF sensor of UAV 105 are detected by a larger number of sensors (shown as squares 735) and the values of squares 735 are "1", indicating that UAV 105 is closer to ToF sensor 605 (compared to FIG. 7B).

FIG. 7J illustrates grid 615 representing a depth map derived from measurements made by ToF sensor 605 of landing pad 109 when UAV 105 has moved closer to landing pad 109, as shown in FIG. 7H. Because UAV 105 has moved closer to ToF sensor 605 and has better centered itself over ToF sensor 605, reflections of optical signals emitted by ToF sensor 605 of landing pad 109 are detected by a larger number of sensors (shown as squares 740) and the values of squares 740 are "1", indicating that UAV 105 is closer to ToF sensor 605 (compared to FIG. 7C).

FIG. 7K illustrates grid 620 representing a difference map derived from depth maps of FIGS. 7I and 7J. Grid 620 represents the difference map derived by the ToF sensor of UAV 105, for example, where a difference is determined between the depth map (grid 610) derived by the ToF sensor of UAV 105 and the depth map (grid 615) derived by ToF sensor 605 of landing pad 109.

In squares of grid 620 (such as square 745) corresponding to squares of grid 610 with an actual value (e.g, square 747) minus squares of grid 615 with undefined value (e.g., square 749), the actual value of grid 610 remains. However, squares of grid 620 (such as squares 751) corresponding to squares of grid 610 with an actual value minus squares of grid 615 with an actual value, include the actual difference of the actual values of corresponding squares in grids 610 and 615. In situation 730, squares 751 include value "0", corresponding to values 1-1.

From the difference map (grid 620), UAV 105 is able to make adjustments to its position in accordance to a position control algorithm. As an example, the position control algorithm may be to center the squares with values and to make all of the squares zero. In order to accomplish this, UAV 105 adjust its position in accordance with a vector 747, which adjusts UAV 105 in the +X, −Y, and −Z directions.

FIG. 8A illustrates a third example situation Boo involving UAV 105 utilizing relative location determined using ToF sensors to land on landing pad 109, landing pad 109 is very large. UAV 105 includes a ToF sensor (not shown in FIG. 8a to simplify the figure) with field of view 107, while landing pad 109 includes a ToF sensor 605 with a field of view 607. As shown in situation 700, UAV 105 is offset from ToF sensor 605 in the −X, +Y, and +Z directions.

FIG. 8B illustrates grid 610 representing a depth map derived from measurements made by the ToF sensor of UAV 105. Because landing pad 109 is very large, reflections of the optical signals emitted by the ToF sensor of UAV 105 are detected by all sensors of the ToF sensor of UAV 105, independent of the fact that UAV 105 is located above, behind, and to the left of ToF sensor 605 of landing pad 109. The values in grid 610 represent the distance between the ToF sensor of UAV 105 and ToF sensor 605 of landing pad 109, where a "2" indicates that UAV 105 and landing pad 109 are far away.

FIG. 8C illustrates grid 615 representing a depth map derived from measurements made by ToF sensor 605 of landing pad 109. Because landing pad 109 is located below, in front, and to the right of UAV 105, reflections of the optical signals emitted by ToF sensor 605 are detected by the upper left sensors of ToF sensor 605, which are shown in FIG. 8C as squares 805. The values in squares 805 represent the distance between ToF sensor 605 and the ToF sensor of UAV 105.

FIG. 8D illustrate the depth map derived from measurements made by ToF sensor 605 of landing pad 109 (grid 615) received from ToF sensor 605. FIG. 8E illustrates the depth map derived from measurements made by the ToF sensor of UAV 105 (grid 610) received from the ToF sensor of UAV 105.

FIG. 8F illustrate a difference map derived by the ToF sensor of UAV 105. The difference map, shown as grid 620, is derived by the ToF sensor of UAV 105 may be determined by subtracting the values of the depth map (i.e., grid 615) derived from measurements made by ToF sensor 605 of landing pad 109 from the values of the depth map (i.e., grid 610) derived from measurements made by ToF sensor of UAV 105. As shown in FIG. 8F, the values of squares 807 correspond to the difference of the values of squares 809 of grid 610 minus the values of squares 811 of grid 615. While the difference of a value of a square with an actual value (e.g., square 813) minus an undefined value of a corresponding square (e.g., square 815) is equal to the actual value of the square (e.g., square 817).

From the difference map (grid 620), UAV 105 is able to make adjustments to its position in accordance to a position control algorithm. As an example, the position control algorithm may be to center the squares with values and to make all of the squares zero. In order to accomplish this, UAV 105 adjust its position in accordance with a vector 819, which adjusts the position of UAV 105 in the +X, −Y, and −Z directions.

FIG. 8G illustrates a difference map derived by ToF sensor of landing pad. The difference map, shown as grid 625, derived by ToF sensor 605 of landing pad 109 may be determined by subtracting the values of the depth map (i.e., grid 610) derived from measurements made by the ToF sensor of UAV 105 from the values of the depth map (i.e., grid 615) derived from measurements made by ToF sensor 605 of landing pad 109. Grid 625 includes squares 821 with actual values, while other squares are undefined. The values of squares 821 may be determined by subtracting the values of squares 805 from the values of squares 823. The value of a square (such as square 825), which is the difference of a square with an actual value (e.g., square 827) and a square with an undefined value (e.g., square 829), is an undefined value.

Although landing pad 109 is generally immobile, a situation may arise where landing pad 109 is mobile. In such a situation, landing pad 109 may make adjustments to its position (in a manner similar to UAV 105 described above). In such a situation, landing pad 109 may adjust its position in accordance with a vector 831, which adjusts the position of landing pad 109 in the −X, +Y, and +Z directions.

[moo] FIG. 8H illustrates an example situation 840 involving UAV 105 utilizing relative location determined using ToF sensors to land on landing pad 109, where situation 840 represents a later time instance of situation 800. As shown in situation 840, UAV 105 has moved closer to ToF sensor 605 of landing pad 109, but remains above, behind, and to the left of ToF sensor 605 of landing pad 109.

FIG. 8I illustrates grid 610 representing a depth map derived from measurements made by the ToF sensor of UAV 105 when UAV 105 is located as shown in situation 840. Because landing pad 109 is very large, reflections of the optical signals emitted by the ToF sensor of UAV 105 are detected by all sensors of the ToF sensor of UAV 105, independent of the fact that UAV 105 has moved closer to landing pad 109 and ToF sensor 605.

FIG. 8J illustrates grid 615 representing a depth map derived from measurements made by ToF sensor 605 of landing pad 109 when UAV 105 has moved closer to landing pad 109, as shown in FIG. 8H. Because UAV 105 has moved closer to ToF sensor 605 and has better centered itself over ToF sensor 605, reflections of optical signals emitted by ToF sensor 605 of landing pad 109 are detected by a larger number of sensors (shown as squares 840) and the values of squares 740 are "1", indicating that UAV 105 is closer to ToF sensor 605 (compared to FIG. 8C).

FIG. 8K illustrates grid 620 representing a difference map derived from depth maps of FIGS. 8I and 8J. Grid 620 represents the difference map derived by the ToF sensor of UAV 105, for example, where a difference is determined between the depth map (grid 610) derived by the ToF sensor of UAV 105 and the depth map (grid 615) derived by ToF sensor 605 of landing pad 109.

In squares of grid 620 (such as square 845) corresponding to squares of grid 610 with an actual value (e.g, square 847) minus squares of grid 615 with undefined value (e.g., square 849), the actual value of grid 610 remains. However, squares of grid 620 (such as squares 851) corresponding to squares of grid 610 with an actual value (e.g., squares 853) minus squares of grid 615 with an actual value (e.g., squares 855), include the actual difference of the actual values of corresponding squares in grids 610 and 615. In situation 840, squares 751 include value "0", corresponding to values 1-1.

From the difference map (grid 620), UAV 105 is able to make adjustments to its position in accordance to a position control algorithm. As an example, the position control algorithm may be to center the squares with values and to make all of the squares zero. In order to accomplish this, UAV 105 adjust its position in accordance with a vector 857, which adjusts the position of UAV 105 in the +X, −Y, and −Z directions.

Figure 9:
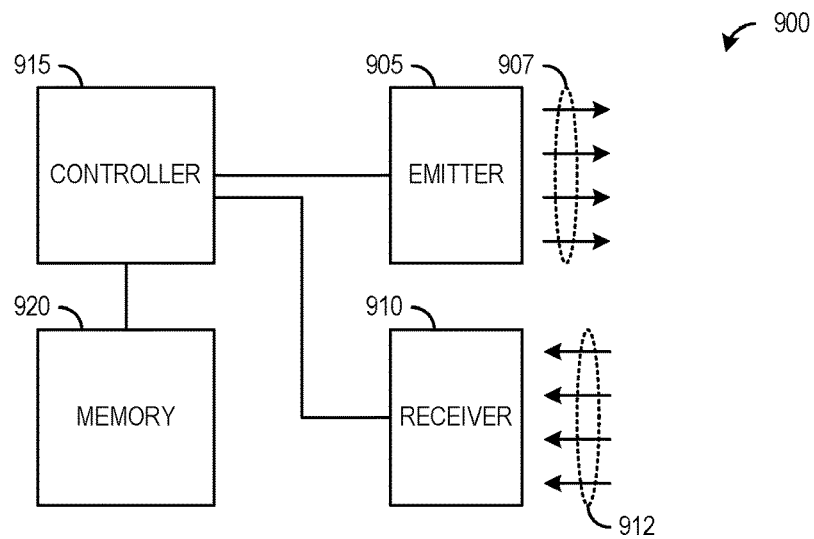
FIG. 9 illustrates an example ToF sensor according to an embodiment.

FIG. 9 illustrates an example ToF sensor 900. ToF sensor 900 may utilize the example embodiments presented herein to determine the location of ToF sensor 900 relative to another ToF sensor. ToF sensor 900 may be attached to or a part of an object or an AD, for example.

ToF sensor 900 includes an emitter 905 configured to emit light signals 907, such as infrared light. Alternatively, emitter 905 may emit electromagnetic signals at other wavelengths. Emitter 905 may be implemented as a VCSEL array, for example. The VCSEL array may be small, on the order of 4×4, 8×8, and the like. Although larger array dimensions are possible.

ToF sensor 900 includes a receiver 910 configured to receive reflections 912 of light signals 907. Reflections 912 arise from light signals 907, emitted by emitter 905, reflect off an object in the environment of ToF sensor 900. A delay arises from light signals 907 propagating from emitter 905 to the object and back to receiver 910. The delay amount is proportional to the distance between ToF sensor 900 and the object, where the delay is greater if the object if further away from ToF sensor 900. Receiver 910 may be implemented as a SPAD array, for example. The SPAD array may be small, on the order of 4×4, 8×8, and the like. Although larger array dimensions are possible. In an embodiment, the SPAD array dimension is equal to the VCSEL array dimension. However, it is not necessary for the dimensions of the VCSEL array and the SPAD array to be equal. An advantage of a small array is that computational requirements associated with processing information associated with the light signals are small.

A controller 915 processes the delay to generate a depth map for ToF sensor 900. In an embodiment, the depth map is generated on a per zone format, where each zone corresponds to a sensor of receiver 910 (e.g., SPAD array).

Controller 915 may also use emitter 905 and receiver 910 to communicate with other ToF sensors, to communicate the depth maps, for example. As an example, emitter 905 may be used to emit light (or other electromagnetic) signals that are encoded with information being transmitted. Another ToF sensor could detect the light signals and receive the transmission from ToF sensor 900. Similarly, receiver 910 may detect light (or electromagnetic) signals that are transmitted by another ToF sensor and ToF sensor would receive a transmission from the other ToF sensor. The transmissions may be simply modulated with the information being transmitted or a more complicated information encoding technique may be utilized to provide more robust communication performance. The transmissions may also implement an optical communication protocol to help improve communication performance.

Controller 915 may process the depth map received from the other ToF sensor, along with its own depth map, to determine the location of ToF sensor 900 relative to the other ToF sensor. As an example, controller 915 may generate a difference map from the depth map received from the other ToF sensor and its own depth map. The difference map provides the location of ToF sensor 900 relative to the other ToF sensor. The difference map may be presented on a per zone format, where each zone corresponds to a sensor of receiver 910. In a situation where the different ToF sensors have different receiver dimensions, a conversion of the received depth map may be performed prior to generating the difference map.

A memory 920 may store the difference map. Memory 920 may also be used to store the depth map generated by controller 915, as well as received depth maps from other ToF sensors.

Figure 10:
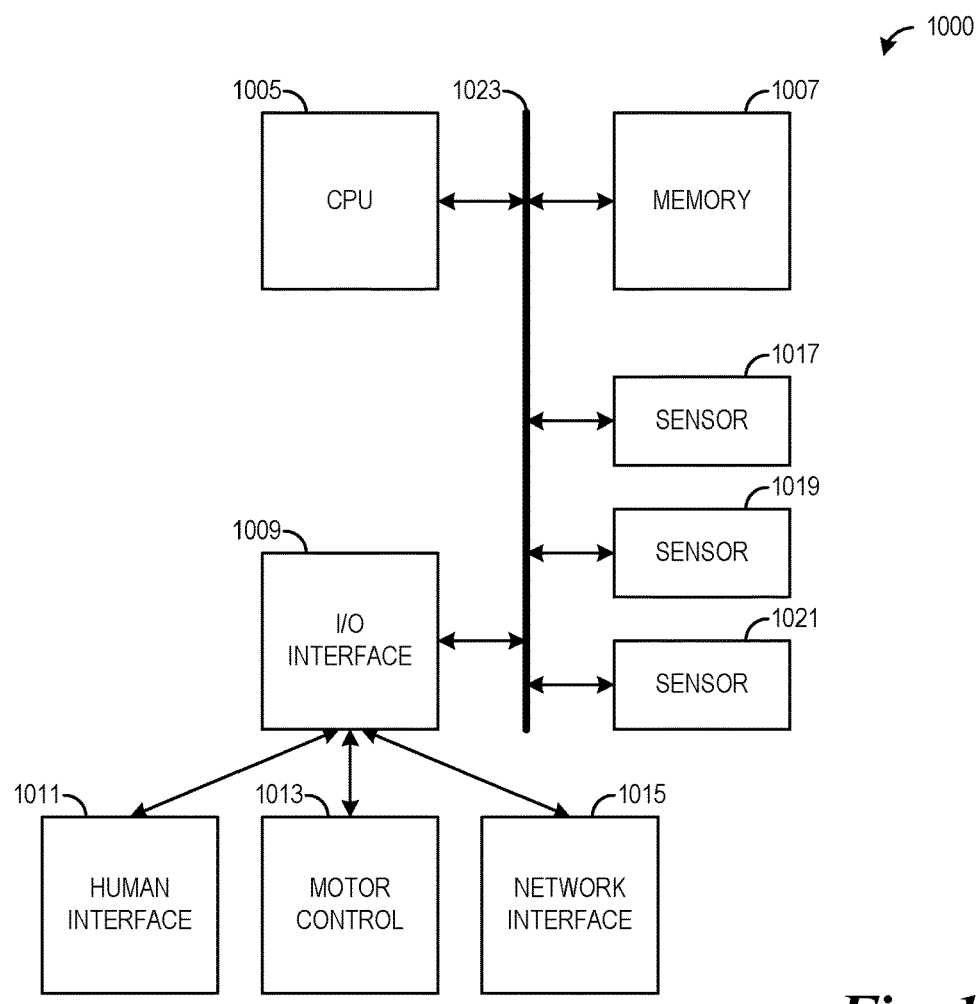
FIG. 10 illustrates an example AD according to an embodiment.

FIG. 10 illustrates an example AD 1000. AD 1000 may include the methods and apparatus disclosed herein. For example, AD 1000 may include a ToF sensor that is capable of determining the location of AD 1000 relative to other ToF sensors.

Specific ADs may utilize all of the components shown or only a subset of the components, and levels of integration may vary from device to device. Furthermore, a specific AD may contain multiple instances of a component, such as multiple processors, memories, I/O interfaces, sensors, etc. AD 900 includes a processing unit (CPU) 1005, a memory 1007, and may further include an I/O interface 1009, a human interface 1011, a motor control 1013, a network interface 1015, and a plurality of sensors 1017-1021. Although shown as a single unit, CPU 1005 may be implemented as multiple processing units. Human interface 1011, motor control 1013, and network interface 1015 may be connected to a bus 1023 or through I/O interface 1009 to bus 1023.

I/O interface 1009 provides interfaces to couple external input and output devices to CPU 1005. As illustrated, examples of input and output devices include a display, a mouse, a keyboard, or a printer coupled to human interface 1011. Other devices may be coupled to CPU 1005, and additional or fewer interface cards may be utilized. For example, a serial interface such as Universal Serial Bus (USB) (not shown) may be used to provide an interface for an external device.

Network interfaces 1015, which may comprise wired links, such as an Ethernet cable, or wireless links to access nodes or different networks. Network interfaces 1015 allow AD 1000 to communicate with remote units via the networks. For example, network interfaces 1015 may provide wireless communication via one or more transmitters/transmit antennas and one or more receivers/receive antennas. In an embodiment, AD 1000 is coupled (e.g., wirelessly) to a local-area network or a wide-area network for data processing and communications with remote devices, such as other processing units, the Internet, or remote storage facilities.

Sensors 1017-1021 may include ToF sensors and other types of sensors, including temperature sensors, ultrasonic sensors, physical tactile sensors, humidity sensors, water sensors, weather sensors, and so on. Some of sensors 1017-1021 may be located within AD 1000, while others may be located external to AD 1000. Some of sensors 1017-1021 are wired to AD 1000, while others may be wirelessly connected to AD 1000.

Example embodiments of the invention are summarized here. Other embodiments can also be understood from the entirety of the specification as well as the claims filed herein.

Example 1. A method implemented by a first ToF sensor, the method including: generating, by the first ToF sensor, a first depth map in accordance with measurements of reflections of an optical signal emitted by the first ToF sensor; communicating, by the first ToF sensor with a second ToF sensor, the first depth map and a second depth map, the second depth map generated by the second ToF sensor; and determining, by the first ToF sensor, a relative location of the first ToF sensor relative to the second ToF sensor in accordance with the first depth map and the second depth map.

Example 2. The method of example 1, where determining the relative location includes generating a difference map in accordance with the first depth map and the second depth map.

Example 3. The method of one of examples 1 or 2, where generating the difference map includes determining a difference between the first depth map and the second depth map.

Example 4. The method of one of examples 1 to 3, where determining the difference includes, for each optical signal measurement value of the first depth map, subtracting the optical signal measurement value of the first depth map from a corresponding optical signal measurement value of the second depth map.

Example 5. The method of one of examples 1 to 4, further including outputting the relative location to a device coupled to the first ToF sensor.

Example 6. The method of one of examples 1 to 5, where the optical signal includes an infrared light signal.

Example 7. The method of one of examples 1 to 6, where the optical signal is emitted by a VCSEL array, and where the measurements of the reflections of the optical signal are made by an array of SPADs.

Example 8. The method of one of examples 1 to 7, where communicating the first depth map and the second depth map includes: transmitting, by the first ToF sensor to the second ToF sensor, the first depth map; and receiving, by the first ToF sensor from the second ToF sensor, the second depth map.

Example 9. The method of one of examples 1 to 8, where transmitting the first depth map and receiving the second depth map occur over VLC.

Example 10. A method implemented by a first device having a first ToF sensor, the method including: obtaining, by the first device from the first ToF sensor, a first depth map generated from measurements of reflections of an optical signal emitted by the first ToF sensor; communicating, by the first device with a second device having a second ToF sensor, the first depth map and a second depth map, the second depth map generated by the second device; determining, by the first device, a relative location of the first device to the second device in accordance with the first depth map and the second depth map; and adjusting, by the first device, a location of the first device in accordance with the relative location of the first device.

Example 11. The method of example 10, where determining the relative location includes generating a difference map in accordance with the first depth map and the second depth map.

Example 12. The method of one of examples 10 or 11, where generating the difference map including, for each optical signal measurement value of the first depth map, subtracting the optical signal measurement value of the first depth map from a corresponding optical signal measurement value of the second depth map.

Example 13. The method of one of examples 10 to 12, where communicating the first depth map and the second depth map includes: transmitting, by the first device to the second device, the first depth map; and receiving, by the first device from the second device, the second depth map.

Example 14. The method of one of examples 10 to 13, where transmitting the first depth map and receiving the second depth map occur over a wireless access technology or VLC.

Example 15. A first device, including: a ToF sensor configured to emit an optical signal and measure reflections of the optical signal; one or more processors; and a non-transitory memory storage including instructions that, when executed by the one or more processors, cause the first device to: obtain, from the ToF sensor, a first depth map generated from the measurements of the reflections of the optical signal emitted by the ToF sensor; communicate, with a second device having a ToF sensor, the first depth map and a second depth map, the second depth map generated by the second device; determine a relative location of the first device to the second device in accordance with the first depth map and the second depth map; and adjust a location of the first device in accordance with the relative location of the first device.

Example 16. The first device of example 15, the instructions further cause the first device to generate a difference map in accordance with the first depth map and the second depth map.

Example 17. The first device of one of examples 15 or 16, the instructions further cause the first device to, for each optical signal measurement value of the first depth map, subtract the optical signal measurement value of the first depth map from a corresponding optical signal measurement value of the second depth map.

Example 18. The first device of one of examples 15 to 17, the instructions further cause the first device to transmit, to the second device, the first depth map; and receive, from the second device, the second depth map.

Example 19. The first device of one of examples 15 to 18, where the first depth map and the second depth map are communicated over a wireless access technology or VLC.

Example 20. The first device of one of examples 15 to 19, where the optical signal includes an infrared light signal.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method implemented by a first time of flight (ToF) sensor, the method comprising:

generating, by the first ToF sensor, a first depth map in accordance with measurements of reflections of an optical signal emitted by the first ToF sensor;

communicating, by the first ToF sensor with a second ToF sensor, the first depth map and a second depth map, the second depth map generated by the second ToF sensor; and determining, by the first ToF sensor, a relative location of the first ToF sensor relative to the second ToF sensor in accordance with the first depth map and the second depth map, wherein determining the relative location comprises generating a difference map in accordance with the first depth map and the second depth map.

2. The method of claim 1, wherein generating the difference map comprises determining a difference between the first depth map and the second depth map.

3. The method of claim 2, wherein determining the difference comprises, for each optical signal measurement value of the first depth map, subtracting the optical signal measurement value of the first depth map from a corresponding optical signal measurement value of the second depth map.

4. The method of claim 1, further comprising outputting the relative location to a device coupled to the first ToF sensor.

5. The method of claim 1, wherein the optical signal comprises an infrared light signal.

6. The method of claim 1, wherein the optical signal is emitted by a vertical-cavity surface-emitting laser (VCSEL) array, and wherein the measurements of the reflections of the optical signal are made by an array of single-photon avalanche diodes (SPADs).

7. The method of claim 1, wherein communicating the first depth map and the second depth map comprises:

transmitting, by the first ToF sensor to the second ToF sensor, the first depth map; and receiving, by the first ToF sensor from the second ToF sensor, the second depth map.

8. The method of claim 7, wherein transmitting the first depth map and receiving the second depth map occur over visible light communication (VLC).

9. A method implemented by a first device having a first time of flight (ToF) sensor, the method comprising:

obtaining, by the first device from the first ToF sensor, a first depth map generated from measurements of reflections of an optical signal emitted by the first ToF sensor;

communicating, by the first device with a second device having a second ToF sensor, the first depth map and a second depth map, the second depth map generated by the second device;

determining, by the first device, a relative location of the first device to the second device in accordance with the first depth map and the second depth map, wherein determining the relative location comprises generating a difference map in accordance with the first depth map and the second depth map; and adjusting, by the first device, a location of the first device in accordance with the relative location of the first device.

10. The method of claim 9, wherein generating the difference map comprising, for each optical signal measurement value of the first depth map, subtracting the optical signal measurement value of the first depth map from a corresponding optical signal measurement value of the second depth map.

11. The method of claim 9, wherein communicating the first depth map and the second depth map comprises:

transmitting, by the first device to the second device, the first depth map; and receiving, by the first device from the second device, the second depth map.

12. The method of claim 11, wherein transmitting the first depth map and receiving the second depth map occur over a wireless access technology or visible light communication (VLC).

13. A first device, comprising:

a time of flight (ToF) sensor configured to emit an optical signal and measure reflections of the optical signal;

one or more processors; and a non-transitory memory storage comprising instructions that, when executed by the one or more processors, cause the first device to:

obtain, from the ToF sensor, a first depth map generated from the measurements of the reflections of the optical signal emitted by the ToF sensor;

communicate, with a second device having a ToF sensor, the first depth map and a second depth map, the second depth map generated by the second device;

generate a difference map in accordance with the first depth map and the second depth map to determine a relative location of the first device to the second device; and adjust a location of the first device in accordance with the relative location of the first device.

14. The first device of claim 13, the instructions further cause the first device to, for each optical signal measurement value of the first depth map, subtract the optical signal measurement value of the first depth map from a corresponding optical signal measurement value of the second depth map.

15. The first device of claim 13, the instructions further cause the first device to transmit, to the second device, the first depth map; and receive, from the second device, the second depth map.

16. The first device of claim 15, wherein the first depth map and the second depth map are communicated over a wireless access technology or visible light communication (VLC).

17. The first device of claim 13, wherein the optical signal comprises an infrared light signal.

* * * * *